(12) United States Patent
Barry et al.

(10) Patent No.: US 11,303,374 B2
(45) Date of Patent: Apr. 12, 2022

(54) TIME DETERMINATION OF DISTRIBUTED EVENTS WITHOUT DISTRIBUTION OF REFERENCE TIME, PHASE, OR FREQUENCY

(71) Applicant: LUMINOUS CYBER CORPORATION, San Jose, CA (US)

(72) Inventors: Charles F. Barry, Santa Clara, CA (US); Nick J. Possley, Gilroy, CA (US); Brendan P. Keller, Sunnyvale, CA (US); Sumanta Saha, Freemont, CA (US)

(73) Assignee: LUMINOUS CYBER CORPORATION, San Jose, CA (US)

( * ) Notice: Subject to any disclaimer, the term of this patent is extended or adjusted under 35 U.S.C. 154(b) by 36 days.

(21) Appl. No.: 16/820,173

(22) Filed: Mar. 16, 2020

(65) Prior Publication Data
US 2020/0220637 A1    Jul. 9, 2020

Related U.S. Application Data

(63) Continuation of application No. 15/946,274, filed on Apr. 5, 2018, now Pat. No. 10,637,597.

(60) Provisional application No. 62/483,304, filed on Apr. 7, 2017.

(51) Int. Cl.
| | | |
|---|---|---|
| *H04J 3/06* | (2006.01) | |
| *H04L 69/28* | (2022.01) | |
| *H04L 43/106* | (2022.01) | |
| *H04W 56/00* | (2009.01) | |

(52) U.S. Cl.
CPC ............ *H04J 3/0667* (2013.01); *H04J 3/06* (2013.01); *H04L 43/106* (2013.01); *H04L 69/28* (2013.01); *H04W 56/0015* (2013.01)

(58) Field of Classification Search
CPC .......... H04J 3/0667; H04J 3/06; H04L 69/28; H04L 43/106; H04W 56/0015
See application file for complete search history.

(56) References Cited

U.S. PATENT DOCUMENTS

| | | | | |
|---|---|---|---|---|
| 5,357,583 | A * | 10/1994 | Sato .................. | G06K 15/1223 382/269 |
| 7,694,335 | B1 | 4/2010 | Turner et al. | |
| 8,169,910 | B1 | 5/2012 | Kohn et al. | |

(Continued)

*Primary Examiner* — Mounir Moutaouakil
(74) *Attorney, Agent, or Firm* — Kramer & Amado, P.C.

(57) ABSTRACT

A network of computing devices includes a timing reference, a free-run node, and an aggregator. The reference calculates a first communication packet having a reference timestamp and reference data, and transmits the first packet to the free-run node. The free-run node receives the first packet from the timing reference, calculates a second packet having metadata that includes the reference timestamp, a sparse hash value calculated from the reference data, and a free-run node timestamp, and publishes the second packet to the aggregator. The aggregator receives the second packet and calculates a compensation value from the reference timestamp, the sparse hash value, and the free-run node timestamp. Computer-implemented methods include the free-run node receiving the compensation value and updating its local clock based on the compensation value. Other methods include the aggregator determining an optimal packet path through a network of computing devices based on the metadata.

10 Claims, 31 Drawing Sheets

(56) References Cited

U.S. PATENT DOCUMENTS

| | | |
|---|---|---|
| 10,425,308 B2 | 9/2019 | Burke et al. |
| 2002/0064185 A1 | 5/2002 | Nakai et al. |
| 2002/0065912 A1 | 5/2002 | Catchpole et al. |
| 2004/0266394 A1* | 12/2004 | Mizell ............ H04W 4/24 455/408 |
| 2005/0089046 A1* | 4/2005 | Moussa ........... H04L 69/161 370/395.52 |
| 2005/0175006 A1* | 8/2005 | Miyazaki ......... H04L 69/08 370/389 |
| 2006/0003754 A1* | 1/2006 | Robison .......... H04L 67/04 455/414.3 |
| 2006/0200856 A1 | 9/2006 | Salowey et al. |
| 2009/0034557 A1 | 2/2009 | Fluhrer et al. |
| 2009/0177930 A1* | 7/2009 | Park .............. G09G 3/2003 714/49 |
| 2011/0158047 A1 | 6/2011 | Beffa et al. |
| 2013/0136144 A1 | 5/2013 | Hong et al. |
| 2016/0149784 A1 | 5/2016 | Zhang et al. |
| 2016/0149788 A1 | 5/2016 | Zhang et al. |

\* cited by examiner

PATH SET A
{T1, T1', T2', T2} = {0,3,5,8}
RTT = (3-0) + (8-5) = 3+3 = 6;
$o_S$ = ((3-0)-(8-5))/2 = 0
if $d_{RA}$=2; $d_{AR}$=4;
$o_a$ = ((3-0)-(8-5)-(2-4))/2 = 1
$o_e$ = $o_a$-$o_S$ = 1
3<$o_e$<3

PATH SET B
{T1, T1', T2', T2} = {0,2,5,6}
RTT = (2-0) + (6-5) = 3+2 = 3;
$o_S$ = ((2-0)-(6-5))/2 = 0.5
if $d_{RA}$=1; $d_{AR}$=2;
$o_a$ = ((2-0)-(6-5)-(1-2))/2 = 1
$o_e$ = $o_a$-$o_S$ = 0.5
-1.5<$o_e$<1.5

PATH TO REFERNCE R1
{T1, T1', T2', T2} = {0,3,5,8}
RTT = (3-0) + (8-5) = 3+3 = 6;
$o_S$ = ((3-0)-(8-5))/2 = 0
if $d_{RA}$=2; $d_{AR}$=4;
$o_a$ = ((3-0)-(8-5)-(2-4))/2 = 1
$o_e$ = $o_a$-$o_S$ = 1
3<$o_e$<3

PATH TO REFERNCE R2
{T1, T1', T2', T2} = {0,2,5,6}
RTT = (2-0) + (6-5) = 3+2 = 3;
$o_S$ = ((2-0)-(6-5))/2 = 0.5
if $d_{RA}$=1; $d_{AR}$=2;
$o_a$ = ((2-0)-(6-5)-(1-2))/2 = 1
$o_e$ = $o_a$-$o_S$ = 0.5
-1.5<$o_e$<1.5

EXAMPLE
{T1, T1'(B), T2'(B), T2} = {0,3,5,8}
RTT(B) = (3-0) + (8-5) = 3+3 = 6;
$o_s(B)$ = ((3-0)-(8-5))/2 = 0
if $d_{AB}$=2; $d_{BA}$=4;
$o_a(B)$ = ((3-0)-(8-5)-(2-4))/2 = 1
$o_e(B) = o_a(B) - o_s(B) = 1$
==> NODE B's TIME IS AHEAD BY 1

EXAMPLE
{T1, T1'(C), T2'(B), T2} = {0,3,5,8}
RTT(C) = (3-0) + (8-5) = 3+3 = 6;
$o_s(C)$ = ((3-0)-(8-5))/2 = 0
if $d_{AC}$=4; $d_{CA}$=2;
$o_a(C)$ = ((3-0)-(8-5)-(4-2))/2 = -1
$o_e(C) = o_a(C) - o_s(C) = -1$
==> NODE C's TIME IS BEHIND BY 1

TIME DETERMINATION OF DISTRIBUTED EVENTS WITHOUT DISTRIBUTION OF REFERENCE TIME, PHASE, OR FREQUENCY

CROSS-REFERENCE TO RELATED APPLICATIONS

This application is a continuation of parent U.S. application Ser. No. 15/946,274 filed on Apr. 5, 2018, which claims the benefit of U.S. Provisional Application Ser. No. 62/483,304, filed Apr. 7, 2017. The entire disclosure of the prior application is hereby incorporated by reference herein in its entirety.

STATEMENT OF PRIORITY

This application claims the benefit of priority under 35 U.S.C. 119(e) to U.S. Provisional Patent Application Ser. No. 62/483,304, titled TIME DETERMINATION OF DISTRIBUTED EVENTS WITHOUT DISTRIBUTION OF REFERENCE TIME, PHASE, OR FREQUENCY, filed Apr. 7, 2017, the disclosure of which is herein incorporated by reference in its entirety and for all purposes.

BACKGROUND

Enterprise and Service Provider Network, Datacenter, Cloud systems have a fundamental need to provide fast, reliable, efficient and/or fair (or unfair, e.g., tiered) network services to their customers, subscribers, users. Typically, these services must meet or exceed an agreed upon level of service quality, often explicitly defined in a Service Level Agreement (SLA). The provider is also often required to prove that the service is meeting the terms of the SLA and this proof is often reported as Key Performance Indicators (KPIs). SLAs and KPIs typically include, but are not limited to, connectivity, delay, jitter, throughput, uptime (reliability), mean time to repair (MTTR) and Mean Opinion Score (MOS).

To date, network service providers and datacenter providers have deployed a large number of monitoring equipment, software and conduct manual and automated network audits in order to measure KPIs to show conformance to the SLAs. These systems must be properly timed in order to provide accurate KPIs. Further, networks are increasingly becoming autonomously and continuously optimized wherein the network KPIs and associated performance metrics are used as an Input to a closed-loop feedback system. It is absolutely essential that these metrics are accurate. This requires accurate time for accurate timestamps.

Today, systems are become more and more virtualized, i.e., running as self-contained processes "virtual machines" on top of a hypervisor, or as "containers." These virtualized systems are increasingly instantiated and controlled dynamically, i.e., "orchestrated". The network itself may include virtual network functions (VNF). A VNF may provide a specific network service, such as firewall or load balancer, and these individual VNF can be arranged in a series known as a "service chain". The topology, configuration and policy may be dynamically orchestrated in a software defined network (SDN).

Alternative time distribution techniques, e.g., Network Time Protocol (NTP), Simple NTP (SNTP), and Precision Time Protocol (PTP), can not scale as networks become virtualized, and dynamically orchestrated. Therefore, there Is a need to provide a scalable system for maintaining accurate timestamps among the multiplicity of network devices that may include devices, subsystems of devices, and virtual devices in order to calculate the Key Performance Indicators during the real-time operation of the network.

SUMMARY

In one aspect, a network of computing devices may include a timing reference node, a free-run node, and a timing aggregator. The timing reference node may further include a first processor and a first non-transitory computer-readable medium coupled to the first processor. The first non-transitory computer-readable medium may be configured to store first computer program Instructions that when executed by the first processor are operable to cause the first processor to calculate a first communication packet comprising a timing reference node timestamp and timing reference node data and transmit the first communication packet to the free-run node. The free-run node may further include a second processor and a second non-transitory computer-readable medium coupled to the second processor. The second non-transitory computer-readable medium may be configured to store second computer program instructions that when executed by the second processor are operable to cause the second processor to receive the first communication packet from the timing reference node, calculate a second communication packet comprising a first metadata packet comprising a combination of the timing reference node timestamp, a sparse hash value calculated from the timing reference node data, and a free-run node timestamp, and publish the second communication packet to the timing aggregator. The timing aggregator may further include a third processor and a third non-transitory computer-readable medium coupled to the third processor. The third non-transitory computer-readable medium may be configured to store third computer program instructions that when executed by the third processor are operable to cause the third processor to receive the second communication packet from the free-run node and calculate a timestamp compensation value based on the timing reference node timestamp, the sparse hash value, and the free-run node timestamp.

In one aspect, a computer-implemented method my include receiving, by a processor, from a reference node, a first communication packet comprising a reference node timestamp and reference node data, calculating, by the processor, a second communication packet comprising the reference node timestamp, a sparse hash value of the reference node data, and a free-run timestamp, publishing, by the processor, the second communication packet to a timing aggregator, and receiving, by the processor from the timing aggregator, a third communication packet comprising timing compensation data.

In one aspect, a computer-implemented method may further include updating, by the processor, a local clock based on the timing compensation data.

In one aspect, a computer-implemented method may include receiving, by a processor, a plurality of communication packets from a plurality of observation points within a computer network, wherein each of the plurality of communication packets comprises a reference node timestamp, a sparse hash value of reference node data, and a free-run node timestamp, and calculating, by the processor, an average transit time for all of the plurality of communication packets having a first reference node source, a first free-run node destination, and a first sparse hash value.

In one aspect, a computer-implemented method may include receiving, by a processor, a plurality of communication packets from a plurality of observation points within a computer network, wherein each of the plurality of communication packets comprises a reference node timestamp, a sparse hash value of reference node data, and a free-run node timestamp, and calculating, by the processor, a time compensation value for a first free-run node destination from all of the plurality of communication packets having the first free-run node destination and the first sparse hash value.

In one aspect, a computer-implemented method may include receiving, by a processor, a plurality of communication packets from a plurality of observation points within a computer network, wherein each of the plurality of communication packets comprises a reference node timestamp, a sparse hash value of reference node data, and a free-run node timestamp, and calculating, by the processor, a first packet transmission path through the computer network for all of the plurality of communication packets having a first reference node source, a first free-run node destination, and a first sparse hash value.

In one aspect, a computer-implemented method may further include calculating, by the processor, a second packet transmission path through the computer network for all of the plurality of communication packets having a first free-run node source, a first reference node destination, and a second sparse hash value.

In one aspect, a computer-implemented method further includes calculating, by the processor, a second packet transmission path through the computer network that further Includes calculating, by the processor, a second packet transmission path through the computer network that differs from the first packet transmission path.

In one aspect, a computer-implemented method further includes receiving, by a processor, a second plurality of communication packets from the plurality of observation points within the computer network, wherein each of the second plurality of communication packets comprises a reference node timestamp, a sparse hash value of reference node data, and a free-run node timestamp, and calculating, by the processor, a third packet transmission path through the computer network for all of the second plurality of communication packets having the first reference node source, the first free-run node destination, and the first sparse hash value.

In one aspect, a computer-implemented method further includes calculating, by the processor, a third packet transmission path through the computer network further includes calculating, by the processor, a third packet transmission path through the computer network that differs from the first packet transmission path.

In one aspect of a computer-implemented method, the computer-implemented method further includes determining, by the processor, from the first packet transmission path and the third packet transmission path that at least one component of the computer network is non-functional.

In one aspect, a network of computing devices may include a timing aggregator and a plurality of subgroups of computing devices. Each subgroup of the plurality of subgroups of computing devices may include a timing reference node and a free-run node. Each of the plurality of timing reference nodes may Include a first processor and a first non-transitory computer-readable medium coupled to the first processor. Each of the plurality of first non-transitory computer-readable medium may be configured to store first computer program instructions that when executed by the first processor are operable to cause the each of the plurality of first processors to calculate a first communication packet comprising a timing reference node timestamp and timing reference node data and transmit the first communication packet to the free-run node. Each of the plurality of free-run nodes may Include a second processor and a second non-transitory computer-readable medium coupled to the second processor. Each of the plurality of second non-transitory computer-readable media may be configured to store second computer program instructions that when executed by the second processor are operable to cause each of the plurality of second processors to receive the first communication packet from the timing reference node, calculate a second communication packet comprising a first metadata packet comprising a combination of the timing reference node timestamp, a sparse hash value calculated from the timing reference node data, and a free-run node timestamp, and publish the second communication packet to the timing aggregators. The timing aggregator may further include a third processor and a third non-transitory computer-readable medium coupled to the third processor. The third non-transitory computer-readable medium may be configured to store third computer program instructions that when executed by the third processor are operable to cause the third processor to receive the second communication packet from each of the free-run nodes of each of the plurality of subgroups and calculate a timestamp compensation value based on the timing reference node timestamp, the sparse hash value, and the free-run node timestamp.

In one aspect of a network of computing devices, the non-transitory computer-readable medium of each of the free-run nodes of each of the plurality of subgroups may be configured to store computer program instructions that when executed by the processor of each of the free-run nodes of each of the plurality of subgroups to cause the processor of each of the free-run nodes of each of the plurality of subgroups to update a local clock based on the timestamp compensation data.

BRIEF DESCRIPTION OF THE FIGURES

The novel features of the aspects described herein are set forth with particularity in the appended claims. The aspects, however, both as to organization and methods of operation may be better understood by reference to the following description, taken in conjunction with the accompanying drawings as follows.

DETAILED DESCRIPTION

Figure 1:
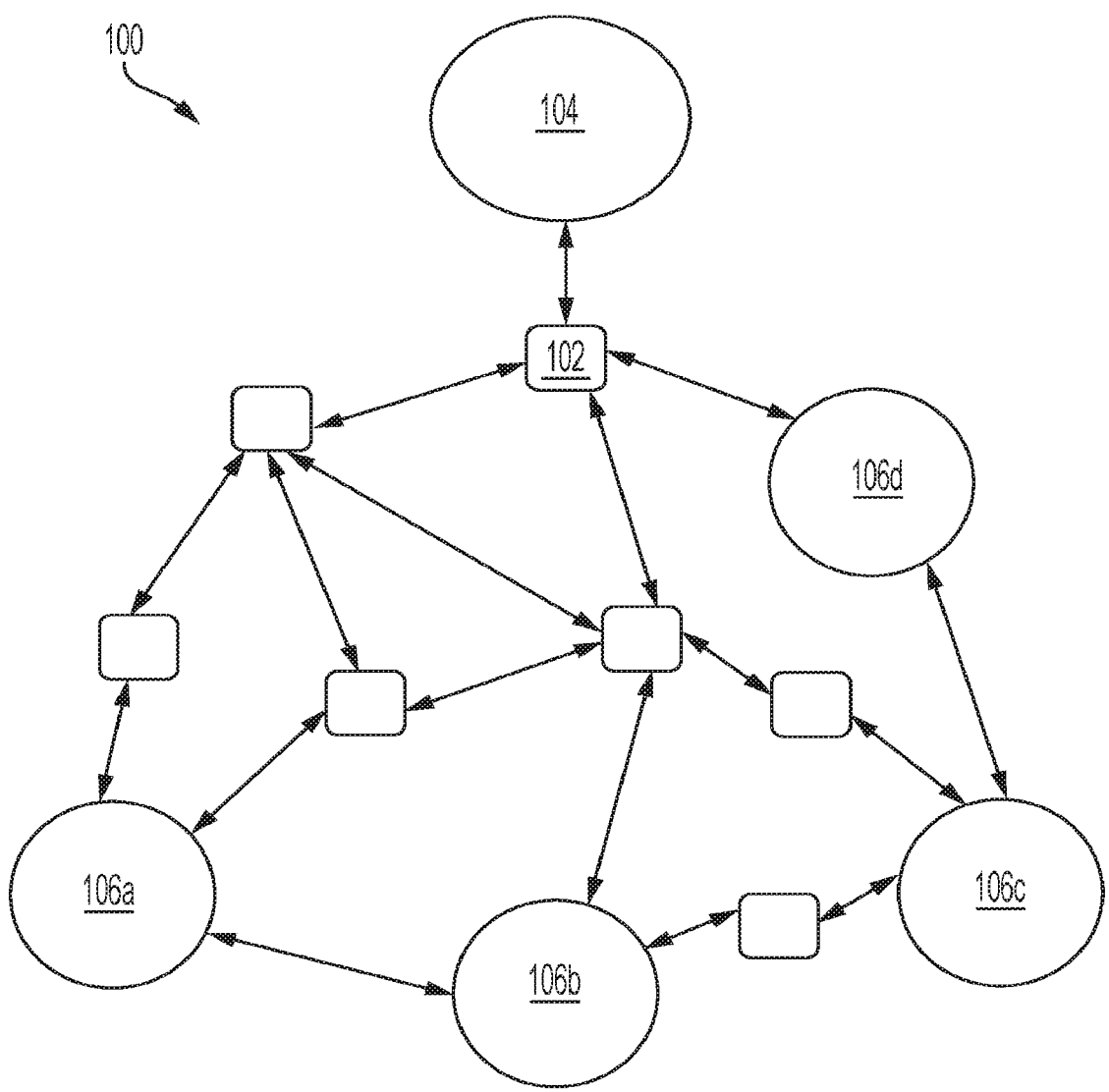
FIG. 1 depicts a first aspect of a network topology.

Reference will now be made in detail to several embodiments, including embodiments showing example Implementations of systems and methods for network monitoring and analytics. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

There are typically three aspects of synchronization: Frequency, Phase, and Time of Day (TOD, also time). Frequency is most commonly associated with oscillators. There are numerous types of oscillators. In computer systems, quartz crystal oscillators are most commonly used. When crystal oscillators are powered, they vibrate at a specific resonant frequency. The crystal's vibration Is converted to an electronic signal, often a sine or square wave that transitions from low to high and back. This signal is used to derive clocks in the system and in particular, the timestamp clock. The crystal frequency will vary slightly from its specified rate based on a number of physical and environmental parameters including crystal structure, crystal impurity, temperature, power, acceleration, electronic noise and age. Despite these variations, typical inexpensive crystal oscillators will oscillate with 100 parts per million (ppm) of their specified frequency. Much better frequency accuracy performance can be achieved through a number of techniques including temperature and aging compensation, more sophisticated structures and crystallography and process including a variety of atomic processes. For our purposes, we consider crystal oscillators with a 100 parts per million (100 ppm) accuracy with respect to the specified rate. Some oscillators are fixed, meaning that they vibrate at their specified frequency (within the bounds of variation noted above), while other are tunable, meaning that their frequency can be modified via an analog voltage input or a digital setting. When an oscillator is not tuned or running at its fixed rate, it is said to be in freerun.

Oscillators are commonly in synchronization circuits that can be tuned to match frequency and often phase to an external reference. The simplest synchronization circuit is an analog frequency locked loop (FLL). As its name suggest, the output of the circuit matches its frequency to the reference. This process is known as syntonization. Neither phase stability nor accuracy is achieved by the FLL In some cases the FLL is based on a voltage controlled crystal oscillator (VCXO) where the output frequency is derived directly from the oscillator. In other cases, the oscillator is fixed, and a frequency offset is computed with the desired frequency output is provided by a digital frequency locked loop (DFLL).

Phase locking ensures not just matching of the frequency, but also ensures matching the time of an oscillator's transition, e.g., a low to high transition of the square wave, to that of the reference. Phase locking ensures a stable relationship of the two oscillators over time, and the system is synchronized. Phase Locked Loops can be analog (PLL) or Digital (DPLL). In timing systems, it is desired to synchronize phase relative to a specific time marker, for instance when locking to a pulse per second (PPS) signal from an external GPS-based time reference. In this case, the PLL can divide the specified oscillator signal to produce a transition at 1 Hz and then lock this signal transition to the reference PPS. Depending upon the design or type of PLL, and the noise or error in the system, the PLL may only be stable (phased locked) but not accurate (e.g., phase is constantly offset from the reference). For instance the transition may be very stable, but always offset by 0.4 s. In order to also be accurately locked, the offset must be driven as near to zero as possible. In this case the PLL is both stable and accurate. For stable and accurate timestamping, the system design goal is to implement stable and accurate PLL circuits designed to handle the range of variation of the oscillator in the presence of noise in the feedback loop.

The output frequency of the FLL or PLL is often a fractional multiple of the underlying oscillator. For instance, a 10 MHz signal is multiplied by 10 to generate a 100 MHz frequency output. This output has better resolution than the original, in this case 10 ns instead of 100 ns.

When a system is started or restarted, the oscillator is in a freerun state. e.g. unlocked and unsynchronized. Provided the reference Is present and the noise in the system is not excessive, the FLL or PLL will eventually lock to the reference and the system moves to the locked state. If the reference becomes unavailable, unreachable or is disqualified (as due to failure or misperformance), the system can move into a holdover state where by its output is deemed to be accurate enough to be used for clocks and timestamps. If the reference is removed for long enough the system will enter an unlocked state or potentially be demoted all the way to the freerun state. If the system is not stable enough to support holdover, it may transition directly to unlocked or freerun from locked.

The oscillator (or FLL or PLL) circuit has no information in and of itself to determine the TOD. It may have its PPS matched very precisely to a reference PPS, but there is no indication of precise time nor time scale (that is, PPS marks the passing of a second, but not what particular second it may be). Clocks are differentiated from oscillators in that they provide an indication of the passage of time. In computer systems, clocks are implemented as a number of bits in a counter or set of counters that are incremented at the input frequency rate. In many cases, one counter represents seconds and is updated each PPS, and the other counter is a fractional second incremented by the resolution of the system per transition of the input frequency (for instance 10 ns per period of the 100 MHz frequency). Upon system start or restart, its docks are initially uninitialized. The clock counters are typically, though not necessarily, set to all zeros, and incremented based on oscillators in free run state. Computer docks can be set to a specific TOD obtained from a time scale such as Coordinated Universal Time (UTC). A computer clock counter value of all zeros corresponds to an agreed upon time epoch. For instance, linux systems are set such that current time can be expressed in integer number of seconds (and milliseconds, microseconds or nanoseconds) since the unix epoch. In this case, a clock counter value of all zeros corresponds to the unix epoch of 1/1/70 00:00:00 in the UTC time scale and a clock counter value of 1577836860 corresponds to 1/1/2020 00:00:00 UTC. There are several time epochs such as that used by Network Time Protocol (NTP) that corresponds to 1/1/1900 00:00:00 UTC. The Precision Time Protocol (PTP) time epoch is the same as the unix time epoch. When time is derived from clocks, care must be taken to convert between clocks of different epochs.

Locking of an oscillator or a clock to a reference inherently implies the availability of a reference, either physically co-located with the oscillator and clock, "node", or distributed to the node via physical means such as a network. The accuracy of the synchronization distributed to the node depends on the FLL or PLL control loop's ability to handle physical and environmental variations that Impact the oscillator and on the variation or noise In the physical path from the reference to the node. In the case that timing is distributed over a computer network, noise will include physical path noise, variations, media access, queuing, scheduling, packet processing, forwarding and so on. The greater the noise, the worse the accuracy and stability. Short term instability or errors in the output frequency that vary faster than once per second are called jitter. Variation over periods of 10 seconds or more is called wander. Variation between 1 s and 10 s is a combination of jitter and wander.

Synchronization requirements for accuracy and stability depend upon the use case. For physical transmission systems such as advanced LTE, jitter needs to be limited to less than 10's of nanoseconds, and long term wander, say for over a day or week, must be less than or equal to 500 nanoseconds. There are a number of jitter and wander specifications and limits, also known as masks, which have been set by the International Telecommunications Union (ITU) for a wide variety of applications. In the case of network analytics, no such standards exist. A reasonable heuristic is to have clock synchronization stability better than ⅕th of the one-way latency between any two network elements. In a wide area network where the minimum one-way latency is 1 millisecond, clock stability should be +/−100 us or better. In a datacenter where systems may be separated only a fraction by microseconds, clock accuracy requirements may easily be on the order of nanoseconds.

A timestamp is the representation of the time the dock was queried or sampled due to an event. The timestamp is usable as long as the time format and time epoch are established. In traditional computer systems it is required for the system clock to lock to a reference in order for the timestamps to be of use in measuring and correlating events across a distributed system. The reference clock need not be common, i.e., the same, for all of nodes the systems, but should be selected such that the maximum variation does not exceed an agreed upon amount. Note also that in linux systems there can be a lot of variation in the time that an event actually occurred and the value returned by the query. Some linux clocks docks have coarse resolution of 1 us as opposed to 10 ns or better. Further, the variation in the query to the dock subsystem may depend on Interrupts, a queue of previous queries, CPU utilization, etc. Thus a timestamp has more error than the underlying clock.

In order to synchronize the clocks at remote network nodes, distribution of time and synchronization from a reference to the remote nodes is typically done using protocols such as NTP, SNTP and/or PTP. These network timing protocols feature a two-way exchange of packets between the reference node (server or grandmaster (GM)) and a remote network node (client or ordinary clock (OC)). The client or OC process the timestamps in the exchange of packets in order to derive time at the client or OC. This process is known as time distribution.

FIG. 1 depicts one aspect of a computer network 100 over which messages communication packets may be transmitted and received. The computer network 100 comprises multiple nodes (for example nodes 104 and 106a-d), in which each node (for example nodes 104 and 106a-d) may represent a computing device such as, without limitation, a desk-top computer, a lap-top computer, a tablet computer, and a smart phone. Each node (for example nodes 104 and 106a-d) may be used by an operator to run computer applications not requiring communications with other nodes. Additionally, each node (for example nodes 104 and 106*a-d*) may be used to run computer applications requiring interactions with data and/or applications resident on other nodes. Each of the nodes (for example nodes 104 and 106*a-d*) may have a local clock to provide time-keeping functions for that node. A reference node 104 may be any node having a local clock that provides time information to the reference node 104 and may serve as a time reference for the local clocks of the other network nodes (for example nodes 106*a-d*). Each free-run node 106*a-d* may have a local clock that provides time information for that free-run node 106*a-d* and which may be compared to the time information provided by the reference node 104. FIG. 1 also includes components 102 that may be used to assist the transmission and routing of communication packets among the nodes in the network. Such components 102 may include, without limitation, one or more switches or routers.

Figure 2:
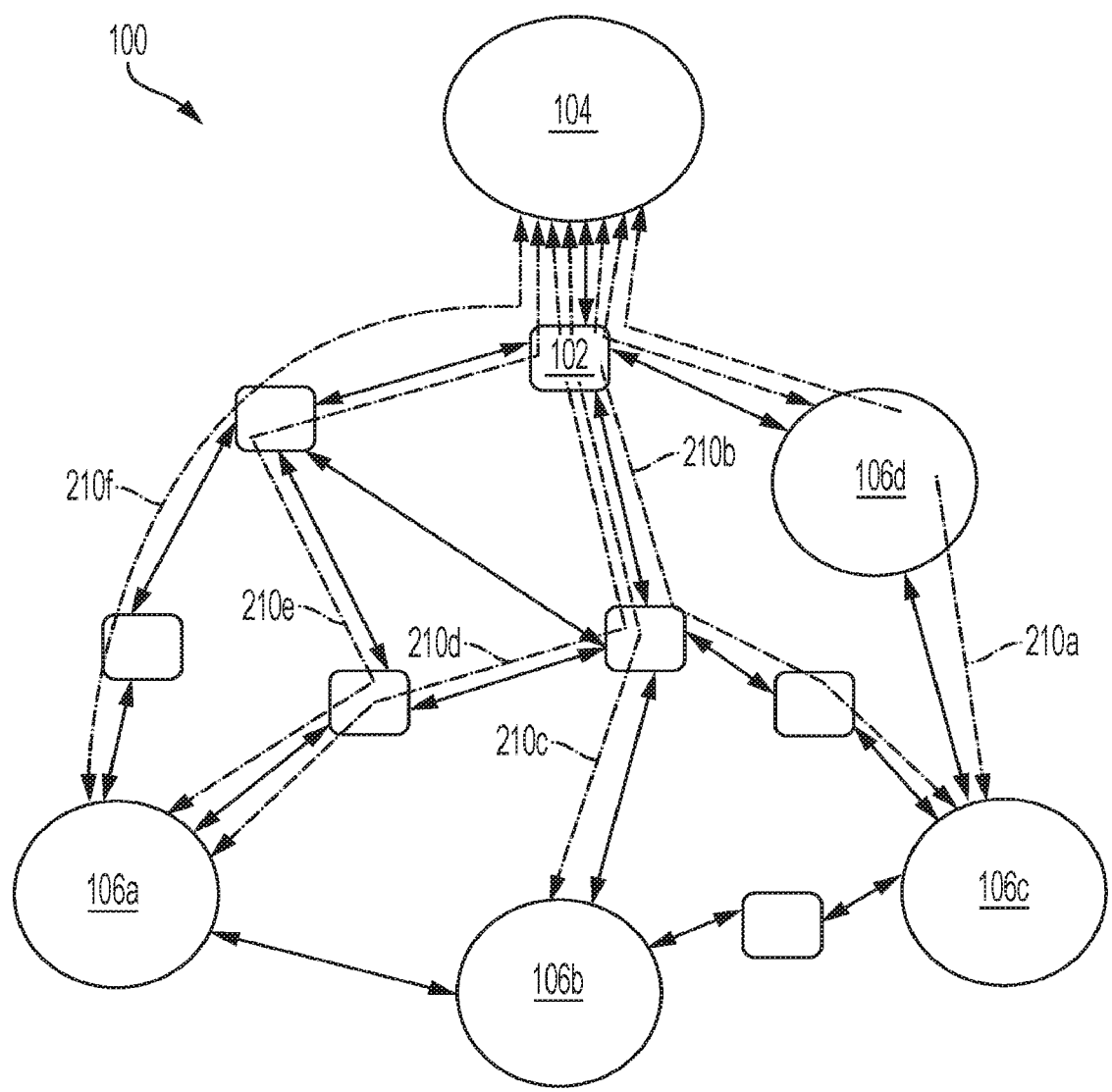
FIG. 2 depicts an aspect of messages passing through the components of the network depicted in FIG. 1.

FIG. 2 depicts examples of message packet paths 210*a-f* that message communication packets may traverse during communications among the nodes 106*a-d* of the computer network 100 depicted in FIG. 1. Such message communication packets may have a content that conforms to any computer related communication protocol. In one aspect, the communication packets may have a content as depicted in FIG. 3.

Figure 3:
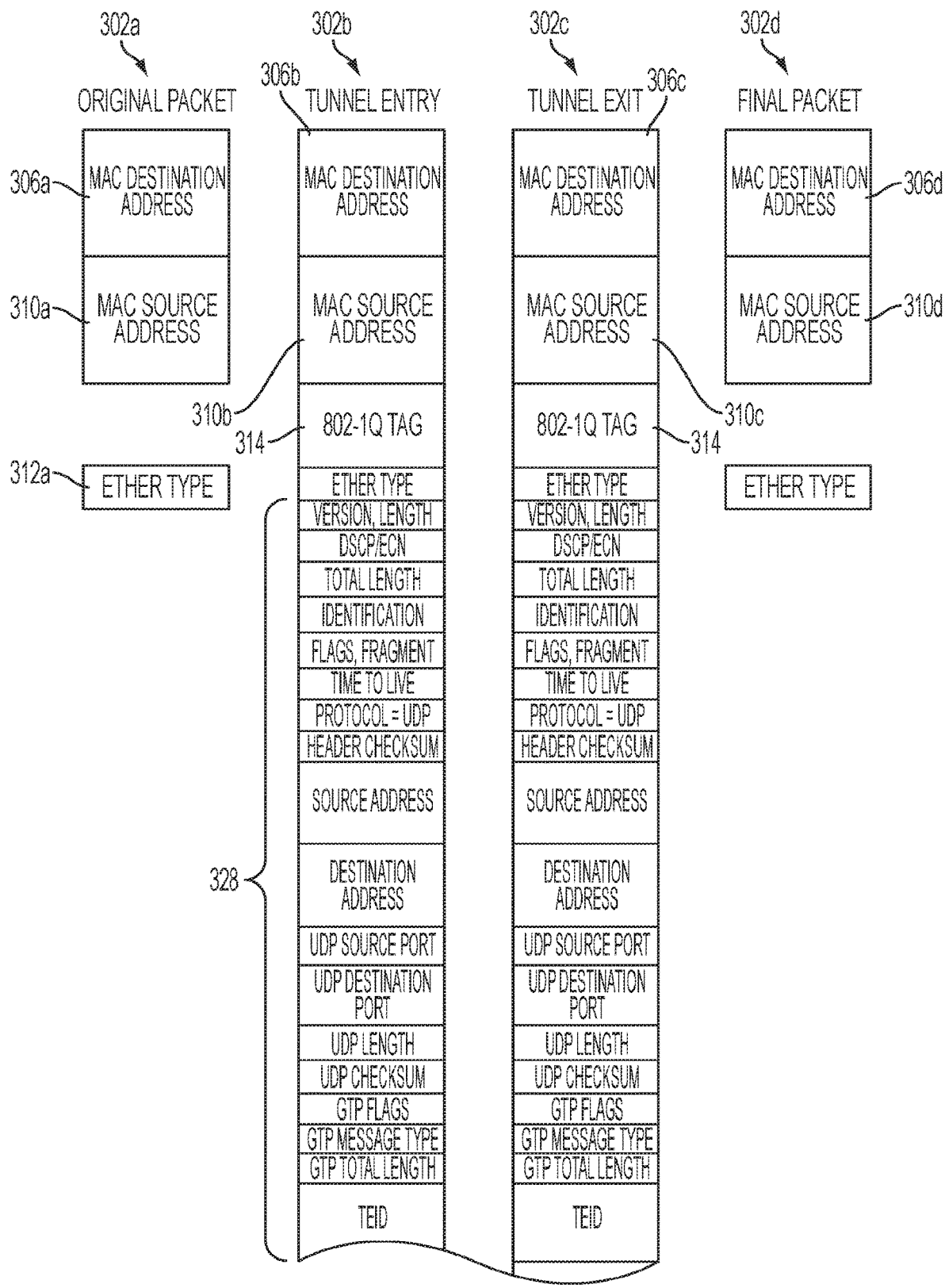
FIG. 3 depicts one aspect of an IPv4 packet during transit of a network.
Figure 3:
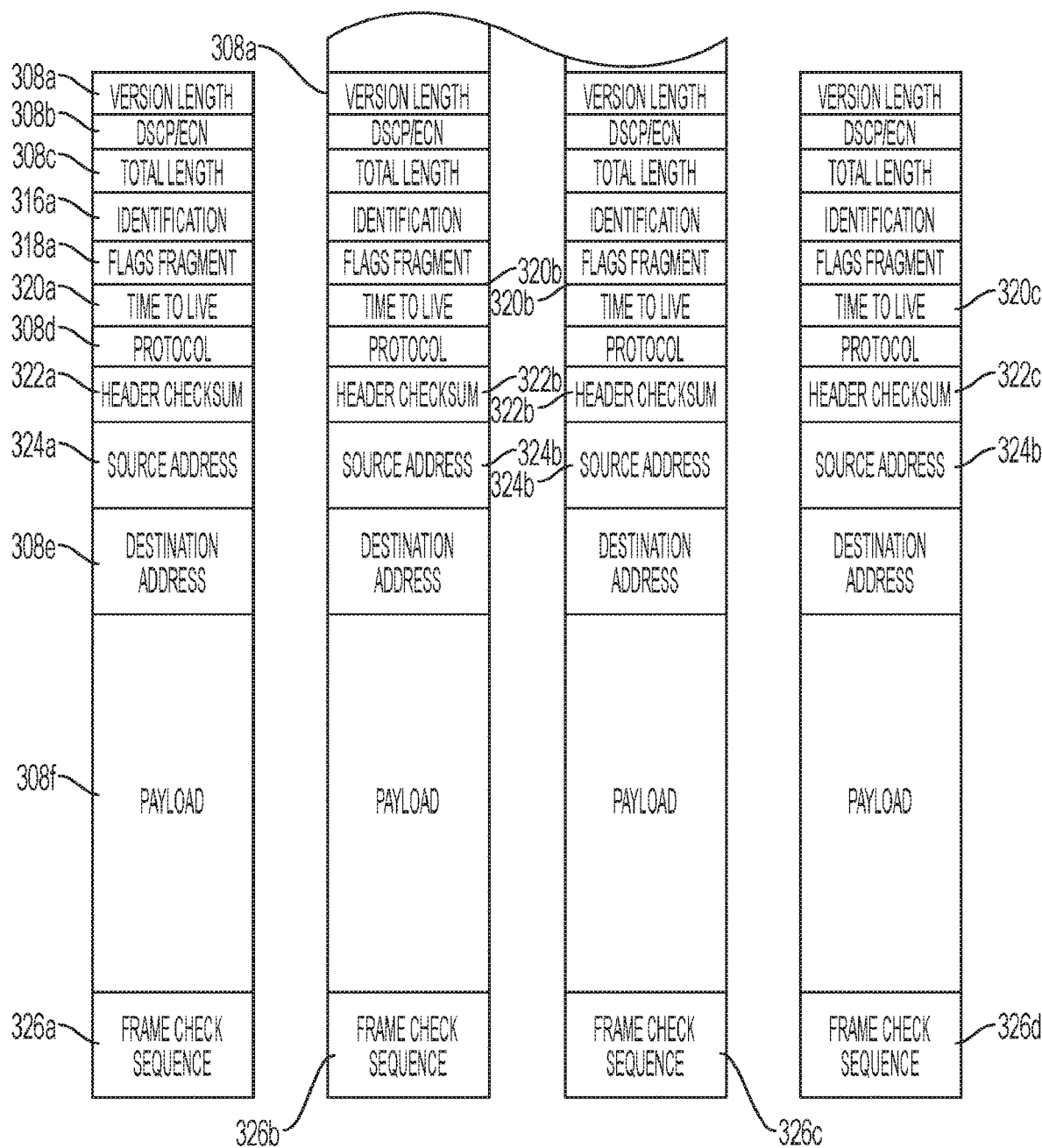

FIG. 3 illustrates a message 302*a* sent as an Internet Protocol version 4 (IPv4) packet transported over an IEEE 802.2 Ethernet frame. Although an IPv4 packet is illustrated, those skilled in the art will recognize that any protocol, frame, cell, and/or combination thereof may be used with the present disclosure. The message 302*a* is observed at four observation points as it traverses a network. The original message 302*a* comprises a plurality of variant and invariant fields. The variant fields of the message 302*a* comprise, for example, a media access control (MAC) Destination Address 306*a*, a MAC Source Address 310*a*, an ether type 312*a*, a packet identification 316*a*, one or more flags 318*a*, a header checksum 322*a*, a source address 324*a*, and/or a frame check sequence 326*a*. In embodiments Including protocols other than IPv4, the variant fields of the message may include additional, fewer, and/or alternative variant fields. The original message 302*a* comprises a plurality of Invariant fields 308*a*-308*f*, such as, for example, a version length field 308*a*, a differentiated services code point/explicit congestion notification (DSCP/ECN) field 308*b*, a total length field 308*c*, a protocol field 308*d*, a destination address field 308*e*, and/or a payload field 308*f*. In embodiments including protocols other than IPv4, the invariant fields of the message may include additional, fewer, and/or alternative invariant fields.

As the message 302*a* (or packet) traverses the network, the message 302*a* may be transformed by one or more network components and/or protocols. For example, in the illustrated embodiment, the message 302*a* is transformed by Network Address Translation (NAT), entry to a General Packet Radio Service (GPRS) Tunneling Protocol (GTP) tunnel, exit from the GTP tunnel, and subsequent handoff to the internet. The originating message 302*a* is shown on the left Upon entry to the GTP Tunnel, the message 302*a* is tagged with an IEEE 802.1Q Virtual Local Area Network (VLAN) tag and encapsulated within an IPv4 packet 302*b* as a User Datagram Protocol (UDP) datagram that is a GTP message containing the original message 302*a*. Encapsulation of the message within an IPv4 packet adds additional variant fields 328 to the message 302*b*. Some fields of the original message 302*a* are changed due to Network Address Translation (NAT) including the original message's IP Source Address 324*b*, Identification 316*a*, flags 318*a*, Time To Live (TTL) field 320*b* and IP Header Checksum 326*b*. The Ethernet MAC Source 310*a*-310*d* and Destination Addresses 306*a*-306*d* are changed by the traversal of routers and the Frame Check Sequence (FCS) has been recalculated.

Despite the many modifications to variant fields of the original message 302*a*, the invariant fields 308*a*-308*f* remain unchanged. The invariant fields 308*a*-308*f* are shown in the four packets 302*a*-302*d*. As the message 302*a* transits routers and traverses the path of the GTP tunnel, the Ethernet MAC Source 310*b*, 310*c* and Destination addresses 306*b*, 306*c* and FCS 326*b*, 326*c* are changed as is the Encapsulating IPv4 TTL 320*b* and Header Checksum 322*b*. The invariant fields of the original message 302*a* are not modified within the GTP tunnel. When the message 320*c* exits the GTP tunnel, the message 320*c* is again transformed for its delivery to the internet by removing the GTP, UDP and IPV4 encapsulations and VLAN tag. The Ethernet MAC Source Address 310*c*, Destination Address 306*c* and FCS 326*c* of the message 302*b*, 302*c* are changed as appropriate. The original message's 302*a* TTL 320*a* is decremented and its Header Checksum 326*a* is recomputed. The fields in the final packet 302*d* are those fields that are invariant across the entire transit path. In one embodiment, the invariant fields, or a subset thereof, are utilized to calculate a sparse hash function value for the message.

In various embodiments, the invariant fields 308*a*-308*f* are defined by the network protocols that act on the message at the various switches and routers along the message's path. In the illustrated embodiment, the fields are shown with the width representing one byte and the height representing the number of bytes. In other embodiments, fields may be any number of bits and/or collections of bits and need not be contiguous nor adjacent and are not constrained to integer byte sizes. For instance, fields, or sub-fields, in the IPV4 packet comprise 4 bits (Version, IP Header Length (IHL)), 3 bits (Explicit Congestion Notification (ECN), Flags), 5 bits (Differentiated Services Code Point (DSCP)) and 13 bits (Fragment Offset). Encapsulations may vary in size. For example, IPv4 supports an optional field of up to 40 additional bytes in the packet header.

Traversal through NAT can modify a number of fields of the original message 302*a* and is protocol dependent. For Instance, the original message 302*a* comprises a UDP datagram. The original message's UDP source port and UDP Header Checksum may be modified by NAT. Other protocols, such as, for example, TCP or ICMP, have different header lengths and different fields that may be modified by NAT. Certain applications and/or protocols, such as, for example, File Transfer Protocol (FTP), comprise fields that may not be encoded as fixed length binary, but as variable length character strings encoded as American Standard Code for Information Interchange (ASCII) bytes. The characters of the strings, as well as the length of the strings, may be changed by NAT. The location of one or more fields within a packet may be moved by NAT, including variant and invariant fields.

In some embodiments, a packet may be fragmented as the packet transits the network. If a first fragment is greater than the size of the maximal size of the fields of the packet that are used for the hash, the hash is computed over the first fragment. If a fragmented packet is partially or wholly less than the number of bytes used for the hash function, a plurality of fragments are used until the hash is complete.

Fragments may be discarded if the end or intermediate fragments are missing and/or do not arrive within a maximal accepted time.

Figure 4:
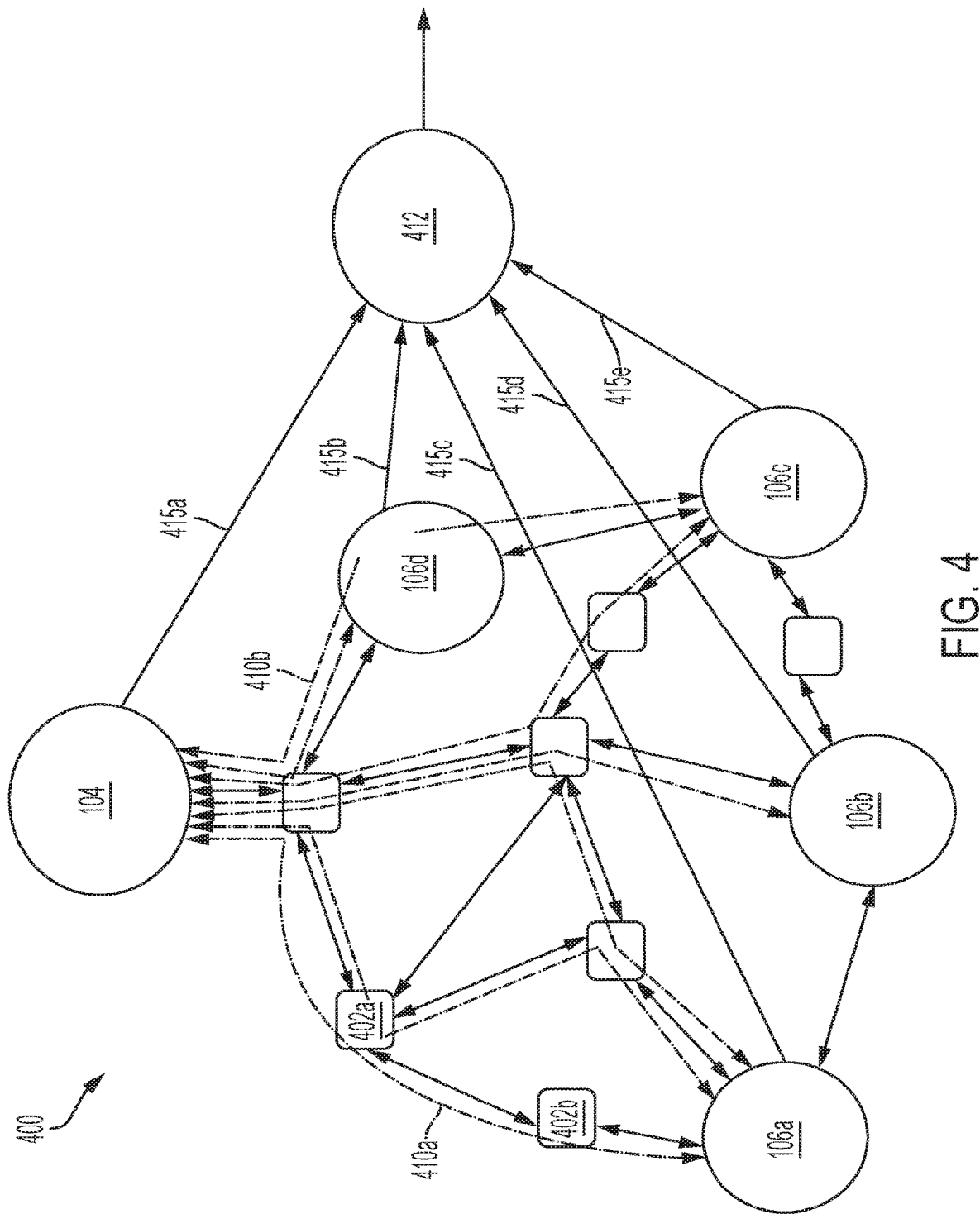
FIG. 4 depicts a second aspect of a network topology including a timing aggregator component.

FIG. 4 depicts another aspect of a computer network 400 over which messages communication packets may be transmitted and received. The network 400 depicted in FIG. 4 is similar to that depicted in FIG. 2 100 but includes a timing aggregator 412. The timing aggregator 412 may be configured to receive metadata communication packets from any one or more of the nodes 104 and 106a-d depicted in FIG. 4. A metadata packet may be constructed at a node based on data contained within a communication packet that originates from another node. For example, as depicted in FIG. 4, communication packets may be transferred over a communication message path (for example 410a,b) between any free-run node (for example 106a) and the reference node 104. In some communication message paths (for example 410a) depicted in FIG. 4, such communication packets may be transferred between the reference node 104 and a free-run node 106a via one or more communication devices 402a,b, such as switches and routers. In alternative communication message paths 410b, such communication packets may be transferred between the reference node 104 and a free-run node 106c via other free-run nodes (for example, 106d). In still other communication message paths, such communication packets may be transferred between the reference node and a free-run node via a combination of other free-run nodes and communication devices, such as switches and routers. Each node 104, 106a-d receiving a communication packet may publish 415a-e a metadata communication packet derived from the data contained in the communication packet to the timing aggregator 412.

Figure 5:
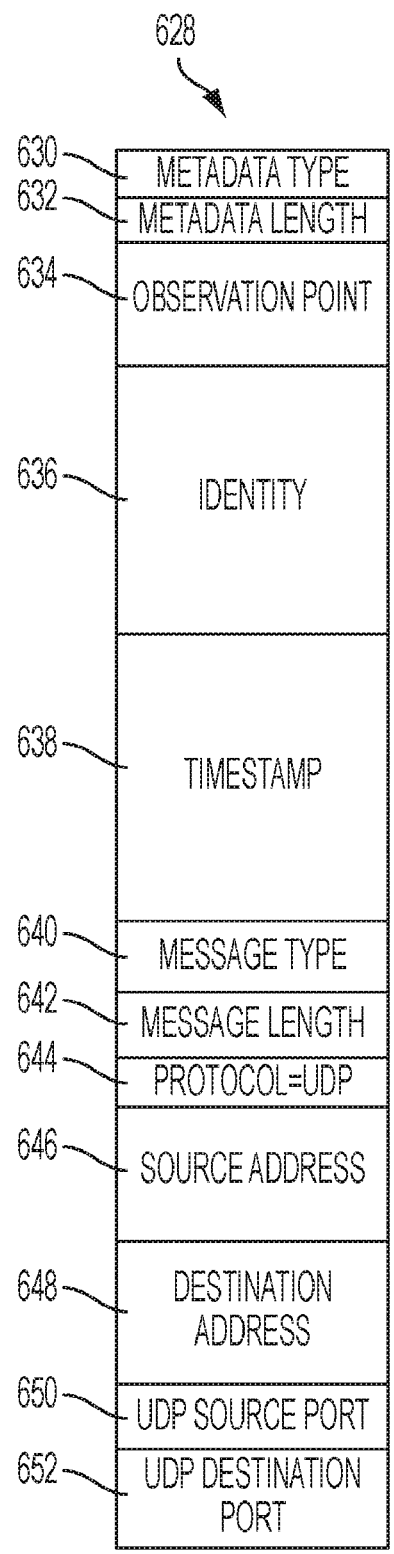
FIG. 5 depicts one aspect of derived metadata for an IPv4 packet.

As described above, in various embodiments, the hash value identifies a message to a high degree of certainty. The hash value, or identity, further enables the identification of a message even if the message has passed through one or more network devices that change some portion of the message and/or transport the message in a number of ways, such as, for example, via frames, packets, and/or datagrams with a potential for fragmentation. The identity of the message is used in combination with other information derived from the message, the message metadata, the location of the observation point and the time of the observation for analysis of the network. The combination of information comprises metadata derived from the message. An example of metadata for an IPv4 packet comprising a message is illustrated in FIG. 5. The exact number of fields, their size and position within the metadata are implementation dependent and may depend on, for example, the protocol, frame, cell, message length, network, and/or other factors.

FIG. 5 illustrates one embodiment of message metadata 628 collected for an IPv4 packet at a first observation point. The message metadata 628 comprises metadata type 630 and metadata length 632 identifiers. The message metadata 628 further comprises observation point dependent metadata, such as, for example, an observation point field 634 and a timestamp 638. The message metadata 628 further comprises message specific metadata, such as, for example, a message Identity 636 generated by the sparse hash function or a plurality of sparse hash functions, a message type 640, a message length 642, a message protocol 644, a source address 646, a destination address 648, a source port 650, and a destination port 652.

Figure 6:
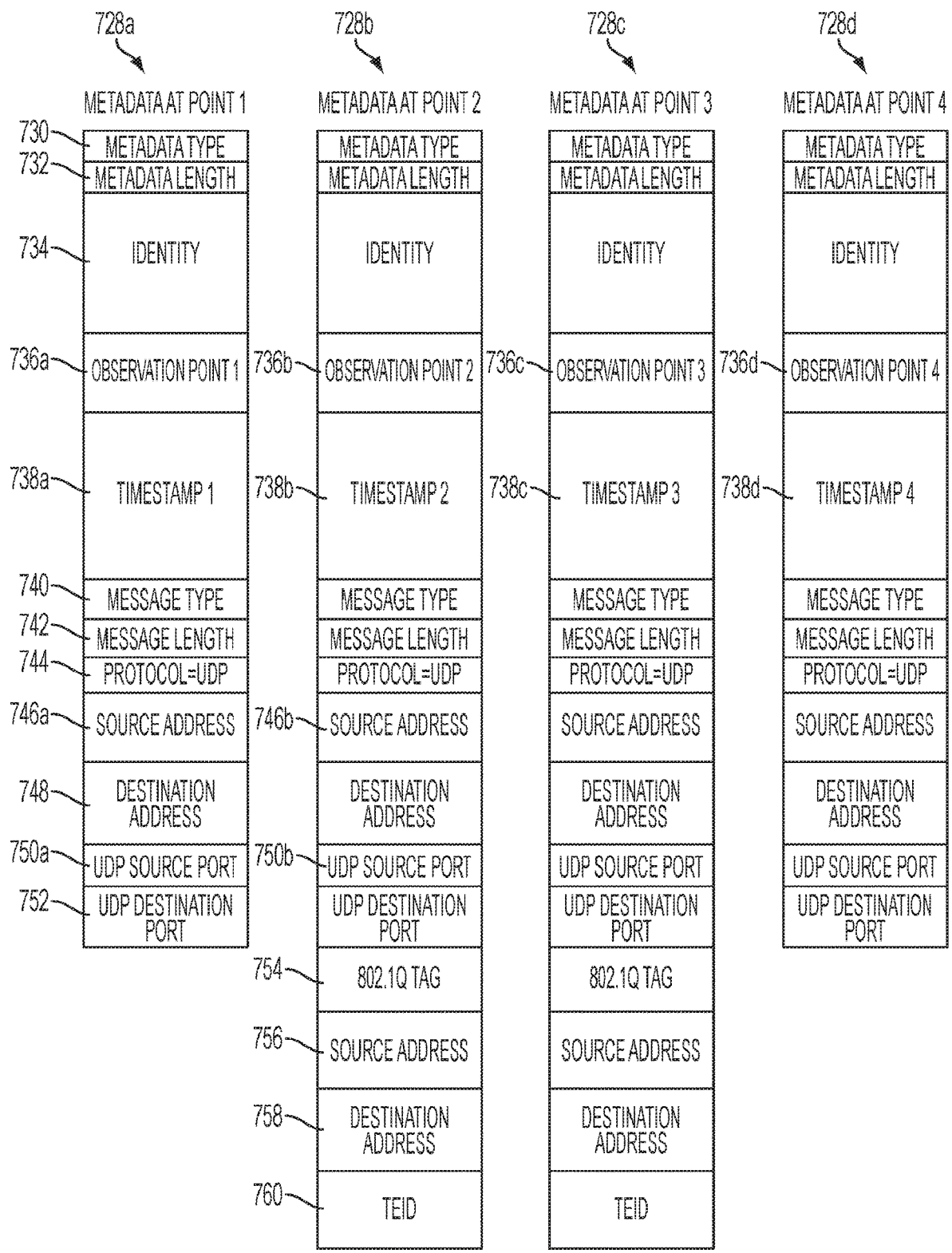
FIG. 6 depicts one aspect of metadata collected at various observation points within a network.

In one embodiment, the metadata created at each observation point In the message's trajectory is similar. Different observation points may generate more or less fields in the metadata. For example, as Illustrated In FIG. 6, the metadata fields for a plurality of observation points 728a-728d may vary. For example, in the Illustrated embodiment, each of the observations points 728a-728d collect metadata, such as, for example, observation point identifiers 736a-736d, a timestamp field 738a-738d, message type 740, and/or additional metadata. A second observation point 702b and a third observation point 702c, corresponding to the entry and exit of the GTP tunnel, comprise additional fields, including the 802.1Q VLAN tag 754, the IPV4 Source 756 and Destination Addresses 758 of the tunnel, and the GTP Tunnel Endpoint Identifier (TEID) 760. In some embodiments, metadata from two or more observation points 728a-728d is associated, or correlated, by matching the identities of the message at each observation point 728a-728d. Although the hash-generated identities 734 are highly probable to be unique to a given message for a given total number of messages, it is still possible that identities may be the same for different messages. In some embodiments, the metadata fields are used to disambiguate different messages with matching hash generated identities. In various aspects, the generated metadata is provided to a network analytics system and used for analysis of the network. In other aspects, the generated metadata may be used by the timing aggregator to provide timestamp compensation to any one or more of the free-run nodes.

Figure 7:
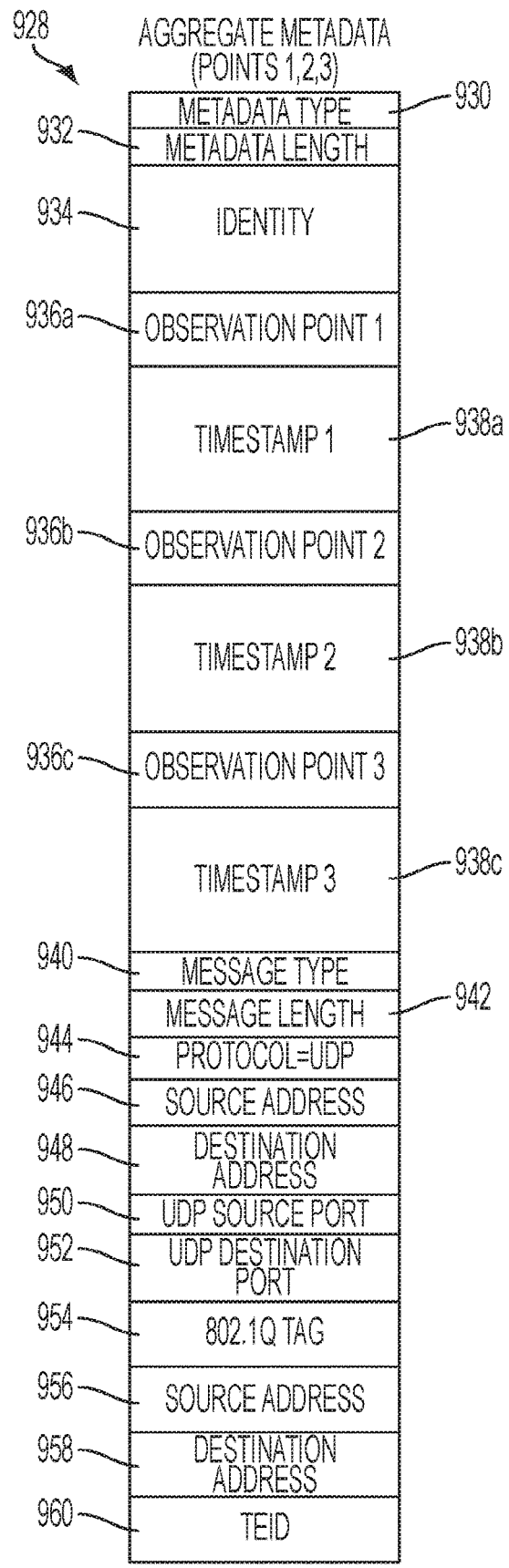
FIG. 7 depicts one aspect of incremental aggregation of metadata.

FIG. 7 illustrates one embodiment of incremental aggregation of metadata. Incremental aggregation of metadata can be performed as desired at any point in the network. The metadata at each observation point within the network is retained for a period of time that allows metadata from other observation points to traverse to an aggregation point Incremental aggregation increases the efficiency of the network as the bandwidth for aggregated metadata is less than multiple separate metadata transmissions. The aggregated metadata comprises multiple observation point and timestamps, along with the various fields aggregated without duplication. The aggregation point generates an aggregated metadata set 928. The aggregated metadata set 928 comprises invariant metadata, such as, for example, a metadata type 930, a metadata length 932, a message Identity 934, a message type 940, a message length 942, a protocol 944, and/or a destination port 952. The aggregated metadata set 928 further comprises observation point dependent metadata, such as, for example, observation point identifiers 936a-936c, timestamps 938a-938c, and/or metadata generated by the observation point, such as, for example, an 802.1Q tag 954, a source address 956, a destination address 958, and/or a TEID tag 960.

Figure 8:
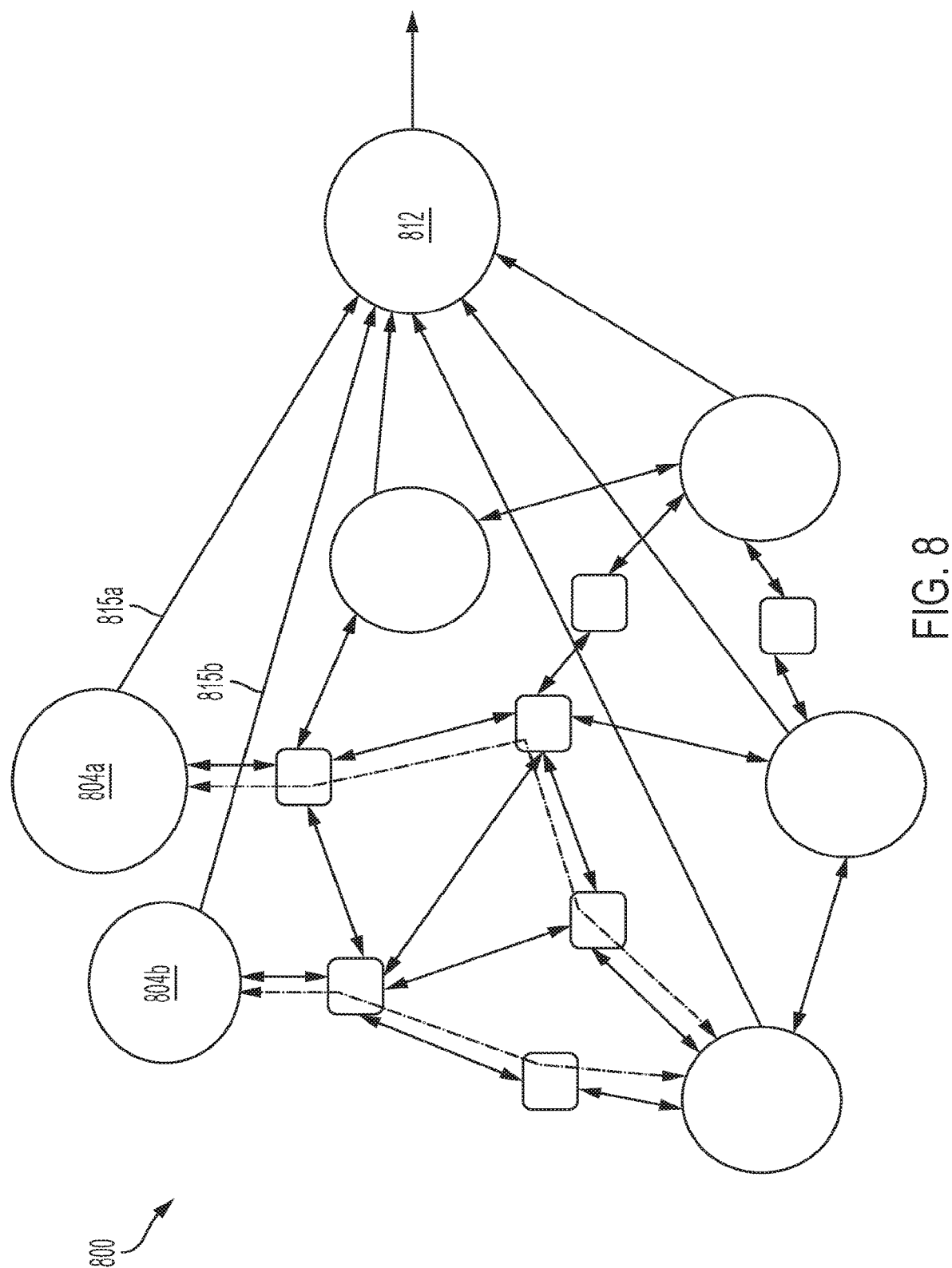
FIG. 8 depicts a third aspect of a network topology including a timing aggregator component and multiple reference nodes.
Figure 9:
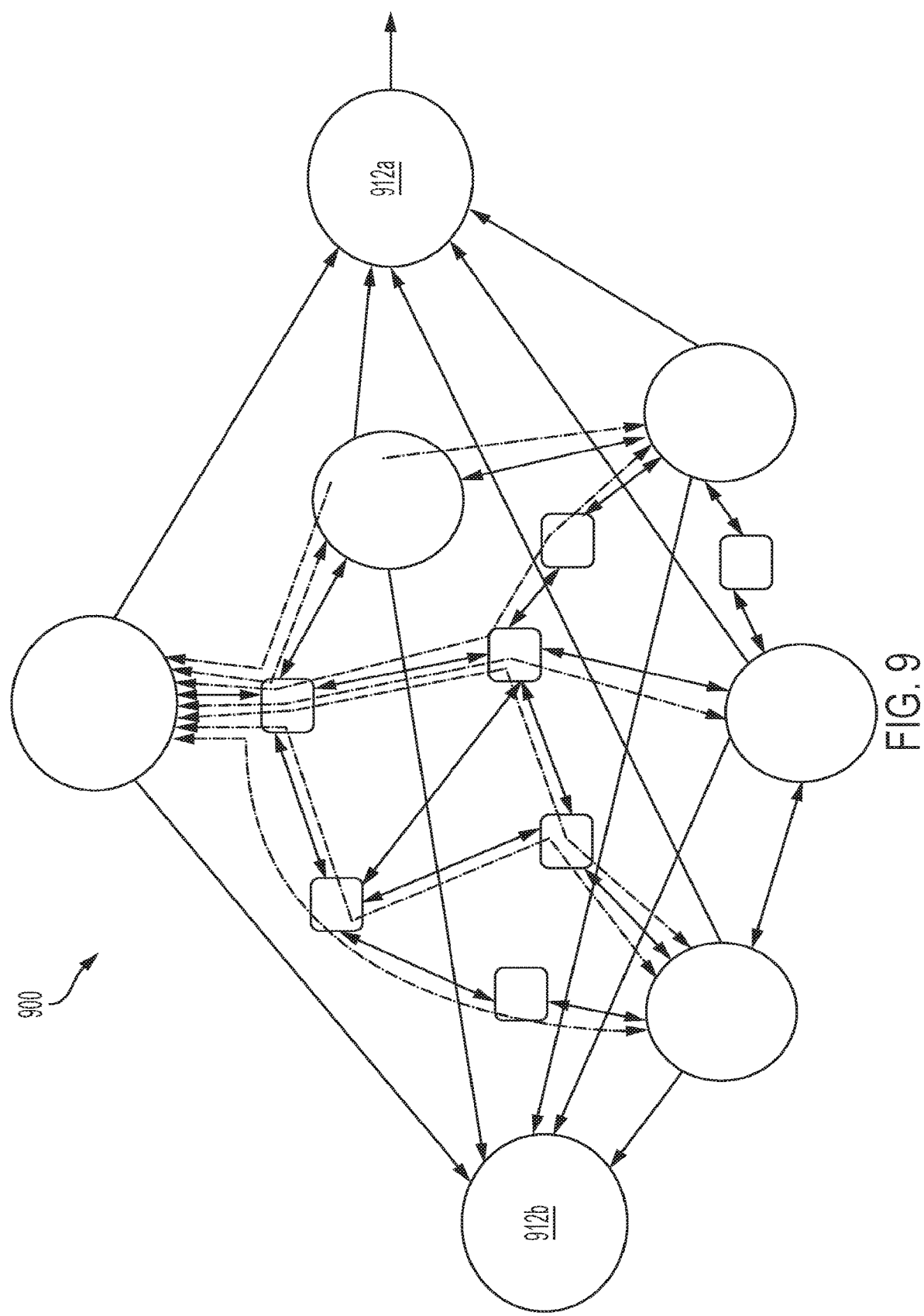
FIG. 9 depicts a fourth aspect of a network topology including multiple timing aggregator components and a single reference node.
Figure 10:
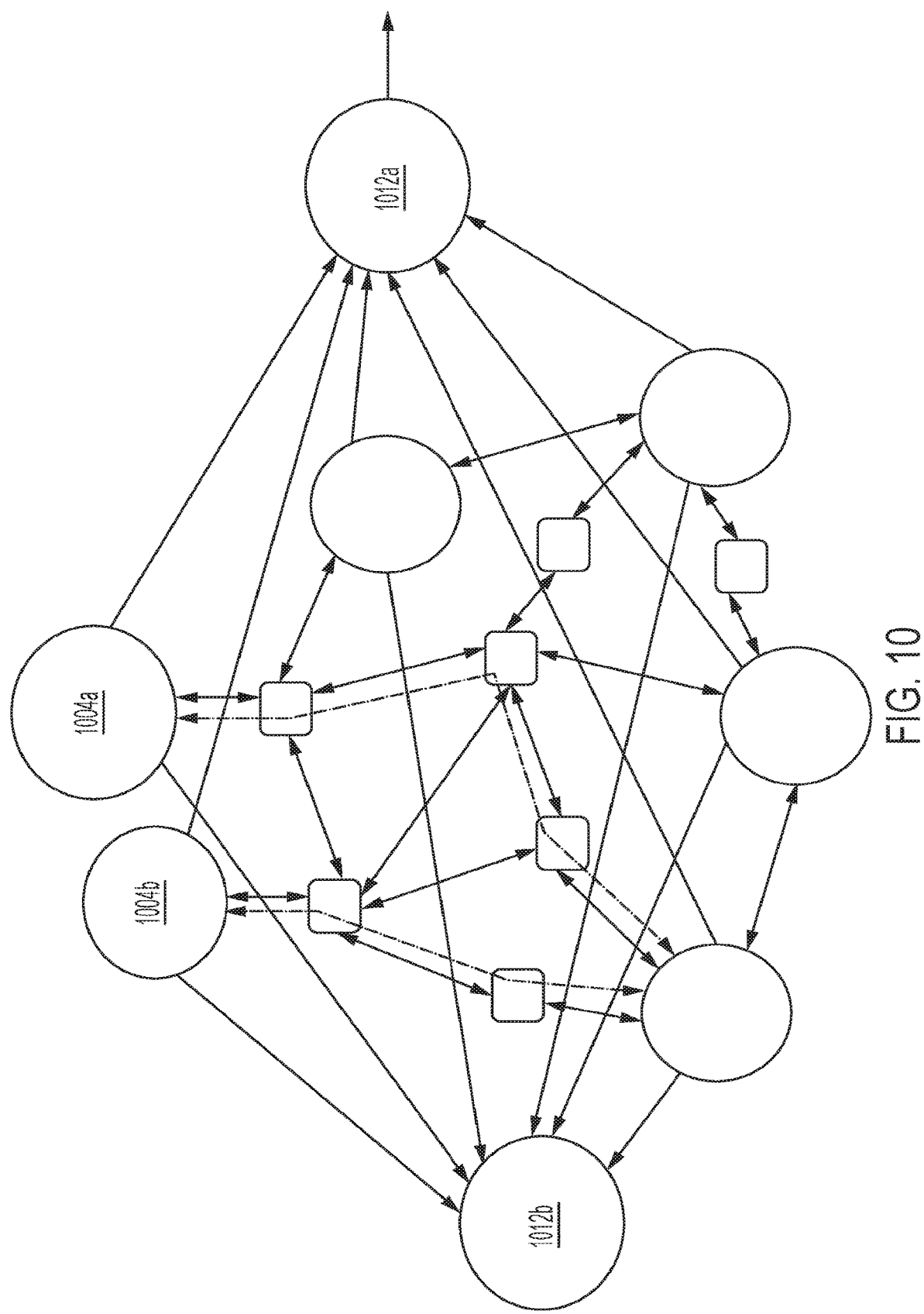
FIG. 10 depicts a fifth aspect of a network topology including multiple timing aggregator components and multiple reference nodes.

FIGS. 8-10 depict alternative aspects of a computer network over which messages communication packets may be transmitted and received.

FIG. 8, for example, depicts a computer network 800 in which more than one timing reference node 804a,b may publish 815a,b (respectively) reference timestamp data to a timing aggregator 812. The docks of each of the multiple timing reference nodes 804a,b may have equivalent accuracy and stability, and may be called fungible docks. For instance, if there are two or more reference nodes 804a,b locked to UTC with accuracy better than +−50 ns, they may be considered as fungible references when timestamp accuracy of +/−50 us is desired. These same two reference nodes 804a,b may not be fungible if timestamp accuracy of +/−500 ns is required. An example using fungible references is shown in FIG. 8. Here we find that reference node 804b provides a more symmetric result with a tighter error bound on the offset estimate than the message packet paths to reference node 804a. In general, any set of minimal message packet paths can be selected and could be bifurcated to include an upstream message packet path A to reference node 804a and downstream message packet path R2 to reference node 804b.

FIG. 9, for example, depicts a computer network 900 having multiple timing aggregators 912a,b. Such a network 900 may provide additional robustness in the event of failure of a single aggregator node (for example 812).

FIG. 10, for example, depicts a computer network having both multiple timing reference nodes 1004a,b and multiple aggregator nodes 1012a,b. Such a system may have improved robustness due to redundancy in the aggregator nodes and due to redundancy in the timing reference nodes.

Figure 11:
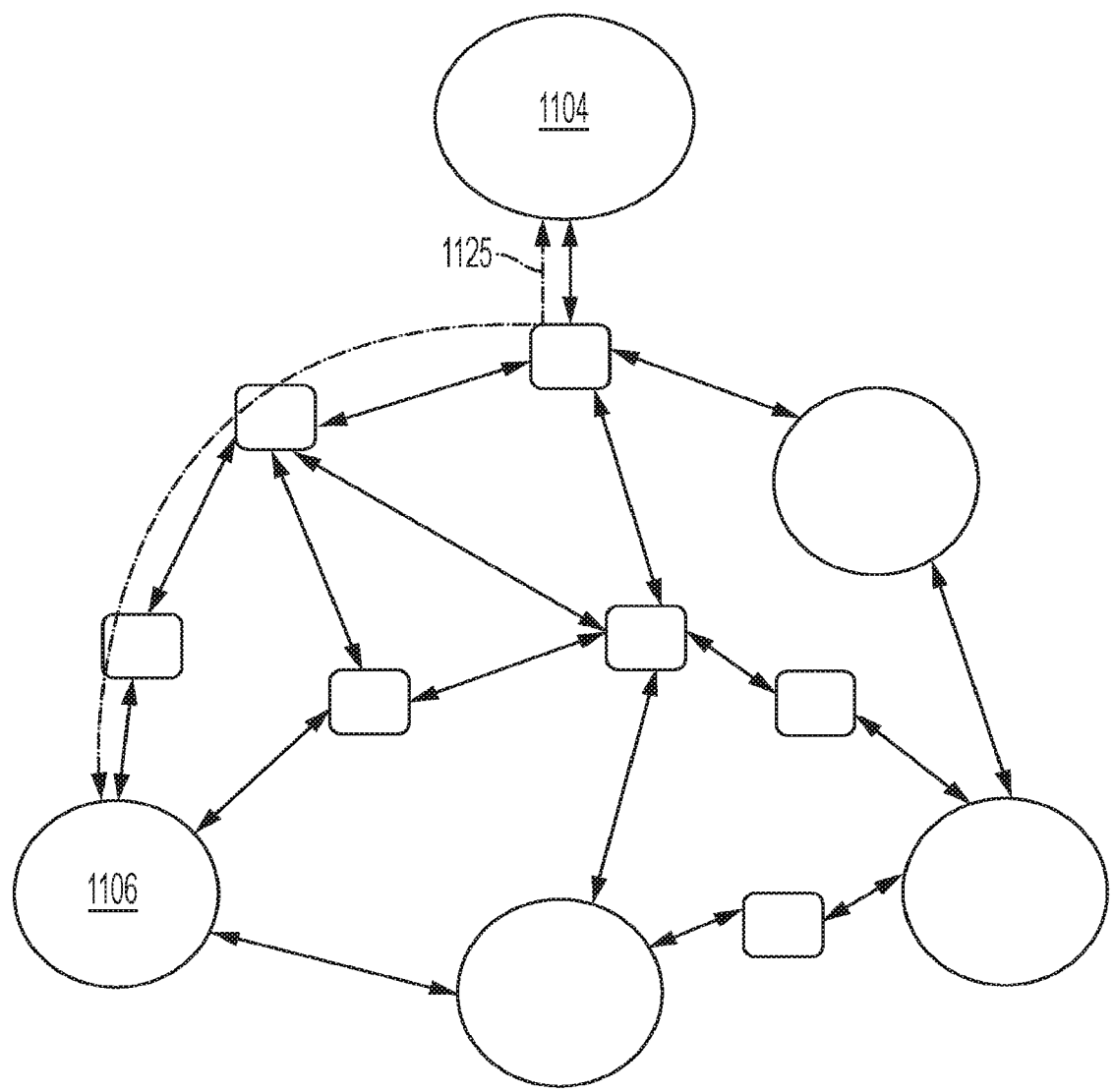
FIG. 11 depicts an aspect of a bidirectional message passing path between a reference node and a free-run node having symmetric time latency.

In its classical form, time offset computation is performed by the client node through the exchange of timestamps of the events T1, T1', T2 and T2'. FIG. 11 depicts a simple exchange of communication packets between a timing reference node 1104 and a free-run node 1106. In FIG. 11, the communication packets exchanged between the timing reference node 1104 and free-run node 1106 traverse a bidirectional message packet path 1125 with equal latency per direction, and therefore the communication exchange between the timing reference node 1104 and free-run node 1106 may be termed symmetric.

Figure 12:
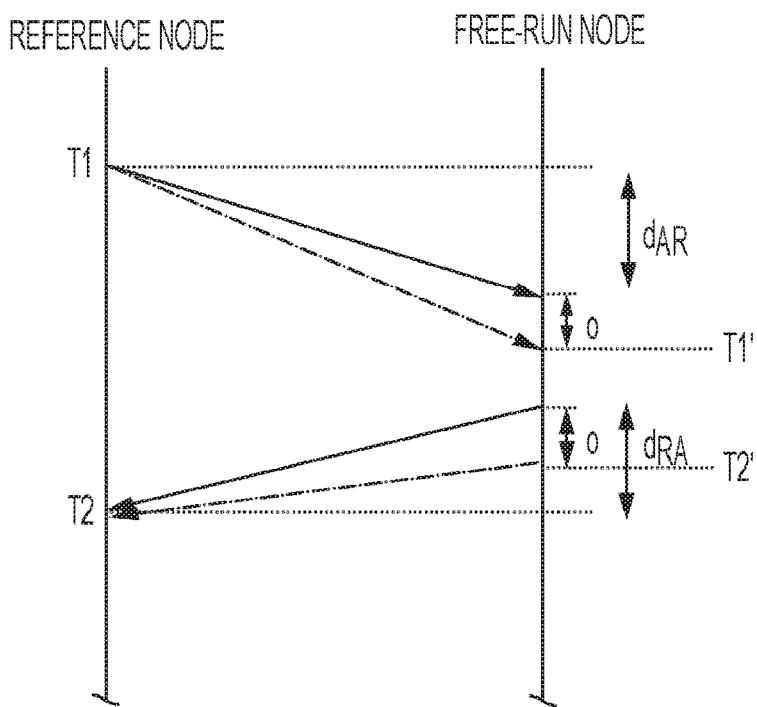
FIG. 12 depicts a message passing timing diagram for a message passed along the bidirectional path with symmetric time latency as depicted in FIG. 11.

FIG. 12 depicts a timing diagram of the classical form of time offset computation for a symmetric exchange of message packet as depicted in FIG. 11. For PTP, T1 is the time when the GM (Reference Node) transmitted a Sync packet to the OC (Free-run Node); T1' is the time the OC received the Sync packet. T2' is the time the OC transmitted a Delay Request packet to the GM; T2 is the time the GM received the Delay Request from the OC. Events T1 and T2 are timestamped with the GM clock, T1' and T2' with the OC clock. The round trip time, RTT, is computed as ((T1'−T1)+(T2−T2'). Time offset between the OC and GM can be computed as o=((T1'−T1)−(T2−T2'))/2, where o is the offset. The offset is subtracted by the OC to move it in line with the GM time. NTP has a similar process using the same basic equations.

There are many limitations to the simplistic offset calculation. The NTP and PTP offset calculation assumes that the upstream and downstream paths have the same delay, i.e., they are symmetric. However, network path delays are almost never symmetric. Optical fibers will have different length, radio paths will vary depending on wavelength and multipath effects, network equipment will have vastly different delays for different interfaces, i.e., the paths are asymmetric. Even more fundamentally, networks need not forward packets over the same bidirectional finks. In fact, many systems will send packets to the "East" and receive packet from the "West" over completely disparate paths. Further, it is a fundamental mathematical fact that it is impossible to determine path asymmetry through use of packet timestamp alone. Thus NTP and PTP will have time offset errors due to network asymmetry.

Second, the calculation presumes that there is no error or noise in the system. As previously stated, oscillators, clocks and networks introduce many types of error or noise into the timestamp process. Oscillator effects are predominantly physical or environmental, network error includes not just the error due to path asymmetry, but includes a wide range of noise at the physical and media access layers including varying time to access the physical media, variable transmit and receive rates, processing, forwarding, queuing and scheduling of the packet for transmission. Timestamp resolution and clock to timestamp query errors are also present.

Accordingly, noise significantly impacts the accuracy of the timestamp-based PLL, or clock servo algorithm. The client's dock servo algorithm processes the offsets to achieve synchronization (frequency, phase and time) to the reference. Due to the system noise, the estimate of frequency and phase will be not be perfect at any given time and thus the clock servo must be run continuously to maintain lock. In order to reduce error, the client or OC processes sets of timestamp packets to reduce noise and sets its dock to the time it has computed locally according to its clock servo algorithm. The clock updates are typically after processing a set of timestamps for periods on the order of seconds, minutes or hours. Between updates, the clock runs at the previously set frequency (often expressed as a drift rate from the local fixed cock).

Clock servo algorithms are not defined in a standard and vary highly from system to system and are quite different in accuracy and stability. Better performing clock servo algorithms are clear differentiators for timing system suppliers. Performance parameters include stability, accuracy and robustness in the presence of noise and other errors such as loss of reference, network path reconfiguration and so on.

A dominant source of noise in networks is Packet Delay Variation (PDV). For the purposes of network timing, PDV is the difference in measured packet transit time, e.g., T1'−T1, experienced by the packet with respect to the other the transit times of other packets at a similar time, e.g., within a window of time or time window. PDV depends upon many issues including access times to shared media, traffic load and contention within the network elements resulting in queuing, scheduling, rate policing, rate limiting, blocking due to store and forward process, the number of network elements transited by the packet (number of hops). In times of light load, these issues may be very minimal, on the order of sub-microseconds or better, and packets arrive at the destination in nearly minimal time, aka "lucky packets". When these lucky packets are network timing packets, they are very useful to the clock servo algorithm. On the other hand, packet latency can be very significant in times of high loading or link oversubscription where latency can grow to 50 ms or more per hop. These packets are not useful to the clock servo algorithm, aka "outliers". PDV processes are often stochastic and while the likelihood that a timing packet will experience excess latency during its transit increases with load, there is also a chance that a timing packet can transit the network in minimal or nearly minimal time.

Most network timing dock servo algorithms process a set of timing packets received over a given time window and detect and exclude those packets with most delay, e.g., outlier detection. Sometimes there are packet latencies that are wrong due to a system error. Abnormally high or low latencies and are detected and excluded as outliers. Packets that experience the least latency, such as lucky packets, typically have the least noise and provide the best timestamps for the dock servo algorithm. The set of packets that are used by the dock servo algorithm are chosen by a packet selection process. However, it can not be guaranteed that there will be any lucky or nearly lucky packets selected in any given window of time and so the dock servo must be able to ride through times where there are no selected packets. During these periods, the clock servo operates in a holdover state where frequency and phase compensation is not updated, or enter into an unlocked or freerun state.

It is useful to understand how two common network processes impact the PDV of network timing packets, and their impact on the likelihood of a packet being lucky.

The first is queuing due to contention of a shared network link. When link utilization, lu, is 75%, a timing packet has a 75% of being queued because the link is in use, and a 25% chance of being transmitted without delay, e.g. as a lucky packet. If the packet traverses N independent hops/links, each of which are 75% utilized, the chance of getting through all N hops as a lucky packet is $(1-lu)^N$. If lu is 0.75 and N is 8, the lucky packet probability is 1/65,536.

For NTP, the maximum packet rate is 1 packet per 8 seconds. In the case of N=8 and lu=0.75, and at this rate, the expectation of the time required for a timing packet to be lucky is 6 days! Therefore NTP time in this scenario is heavily impacted by queuing delays with substantial error and wander and is virtually unusable for network analytics.

For PTP, even at a typical rate of 64 packets per second, in the case of N=8 and lu=0.75, a lucky packet is expected once every 1024 s, or only once 17 minutes. The PTP clock servo algorithm will take excessive times to converge to a stable accurate phase estimate, typically hours.

Another problem is that in real systems, that network links are not independent, i.e., packets tend to share the same path over time, such as TCP sessions, voice and video conferencing traffic. Here a dominant source of latency is due to store and forward blocking. Most ethernet based network elements require the full reception of a an ethernet frame (aka packet) so that its Frame Check Sequence (FCS) can be checked for consistency before forwarding. This process introduces dispersion due to packet size. Larger frames take longer to receive than smaller frames. Further, this store and forward latency is experienced at each hop on the path from source to destination. Assuming that all link have the same line rate, the store and forward latency, dsf=8*B*N/L (seconds), where B is the length of the packet in bytes, L is the link rate in bits per second (bps) and N is the number of hops(links). For the case of N=8, L=1e9 and B=100, dsf=6.4 us. When B is 1500, dsf is 96.0 us. In this case, the dispersion of network transit delays for large packets compared to small packets is nearly 90 us.

In some time distribution protocols, such as NTP and PTP, chose to use smaller packets, on the order of 100B, expecting that they would provide a smaller RTT and PDV due to effects such as store and forward. However, these protocols missed a strikingly important fact. Due to store and forward dispersion, small packets very often catch up to and then are queued behind larger packets in front of them on the same path. This greatly reduces the chance of a small packet being lucky. Conversely, a large packet (or frame), at the size of the Maximum Transmission Unit (MTU) cannot be blocked by store and forward of other larger packets because themselves are the largest packet type. Therefore, large packets are far more likely to be lucky packets than small packets.

Thus small packets have the smallest RTT on average and large packets have the least PDV on average. Some systems only use one packet size as mentioned and therefore can not take advantage of this distinction.

In addition, NTP servers (and PTP grandmasters) are typically limited to the number of clients (or OC) that can be serviced. For scalability there must be a multiplicity of servers each timed to a common reference, and/or servers that synchronize a limited set of clients that in turn act as a server to additional nodes and so on in a hierarchical fashion. While this timing hierarchy provides scale, it also compounds inaccuracy since each timing layer depends on the accuracy (and inaccuracy) of the previous layer. In NTP parlance, each step removed from the highest level reference is a stratum layer. For instance, a NTP server locked directly to a GPS reference is Stratum 1, the client locked to this server is Stratum 2 and so on. The stratum system is not a good indication of clock quality, but does inform the system of the number of NTP clock servo loops between it and its global reference. As systems become more virtualized and dynamic, nodes are ephemeral, thus the number of nodes is variable and the network topology changes over time. In these ephemeral networks, it is very difficult to build a stable timing hierarchy. Further, the practical reality of timing protocols is that the time for a clock servo to lock to within the required stability and accuracy is on the order of tens of minutes or more. As the number of hierarchy levels Increase, this can result in hours of time to lock. In fact, the very systems that need time or that act as a time server for other systems may not exist long enough for lock to be achieved. PTP is even more dependent upon an exchange of setup information than NTP. In addition, in order to maintain an accurate lock, PTP may need to exchange 64 packets per second or more using up bandwidth that would be better utilized by the network services as opposed to timing the network. It is therefore impractical for NTP or PTP protocols to provide timing in these dynamic networks.

Due to the aforementioned issues and others, alternative network timing protocols are often highly inaccurate, complex or costly to deploy. In practice, NTP does not achieve timestamp accuracy better than 10's of milliseconds predominantly due to very low packet rates, small packet size and lack of knowledge of the network path. PTP can achieve greater accuracy, but requires a much higher communication rate and implementation of specialized PTP capability in all or substantially all intermediate nodes, including specialized hardware for timestamp compensation. When property deployed network wide at every node, PTP can deliver stability of better than 1 microsecond but with great complexity and cost. Further, it is often the case that these protocols are only partially deployed or improperly deployed or misconfigured. The result is that these protocols cannot be relied upon for accurate timestamps for events, and that statistics derived from these erroneous timestamps are not reliable.

Heretofore, the discussion of timestamps has referred to network events of interest include time of arrival, departure, or processing of network packets at various nodes. However, timestamps can be associated with any type of event, such as a state change of a system, and internal or external I/O transactions, CPU data, memory, storage or other resource utilization, task or transaction initiation, progress and completion, physical or environmental changes, system signals including alarms, alerts and notifications, and, of course, inter-processor and network message transactions. Messages include Information (e.g., data) that may be Individual or collective state data, static blocks of data such as files or documents, continuous streams of communications such as voice, one-way video or two-way video-conferencing and ever-increasingly, machine-to-machine communications. These messages may transported over physical or virtual networks as a single message, sub-divided into sets of smaller messages, or aggregated together into a group message. Messages can be transported over networks as continuous streams or encapsulated in service data units (SDU), protocol data units (PDU), datagrams, packets, frames and/or cells. In physical networks, messages can be transported over wired (e.g., copper, twisted pair, optical fiber) or wireless physical media. In compute nodes (e.g., servers, computers, laptops, cell phones, intelligent network systems), messages may be delivered between compute, storage and network subsystems over parallel or serial buses. Further, messages between and among central processing units (CPU) processes including threads, virtual machines and containers may be transferred between other CPUs, network interfaces, memory and storage elements. In some cases, the message information itself is stationary, i.e., held in memory or storage, while access to the message is passed or shared among processes and where the event of interest is the time of granting access or passing of the message.

The timestamp may be Included inside the original packet, or prepended, appended or inserted into the packet and transported with the packet, or can be associated with a copy of the original packet or a partial subset thereof, or a representation of the packet that uniquely identifies the particular packet, such as metadata as outlined previously. Timestamps with event identifiers may be held in memory or storage for local processing. Timestamps can be global, i.e., based on a global reference (or set of global references), local, i.e., based on a local reference (or set of local references). A global, or local reference may be considered to be "absolute" if it is referenced to a global time scale such as Global Positioning System, or Coordinated Universal Time. The global or local reference may also be free running. "Traceability" of timestamps is assured when the time source of the timestamps can be proven to have been derived from a time scale, such as GPS or UTC. Note that traceability does not in Itself ensure accuracy, only that the time was derived from the referenced time scale. In addition, timestamps may be relative, i.e., the time from a first event relative to a second event such as the elapsed time to a second event, and translatable to local, global or absolute time if the second event is referenced to global or absolute time.

In some embodiments, the network monitoring and analytics system comprises a functional block. The functional block determines the existence and location of the original fields of message. The functional block may utilize knowledge of the functional blocks location and/or algorithmic calculations to determine the existence and location of the original fields of the message. For example, in one embodiment, a packet is scanned for a VLAN tag, IPV4, UDP and GTP encapsulations returning an offset pointing to the original message. In embodiments comprising variable sized transformations, the function returns a list of pointers and lengths to the various fields and/or block of fields. In many networks, packets entering the network from the outside, for example, the internet, will experience different transformations from those egressing the network.

Figure 13:
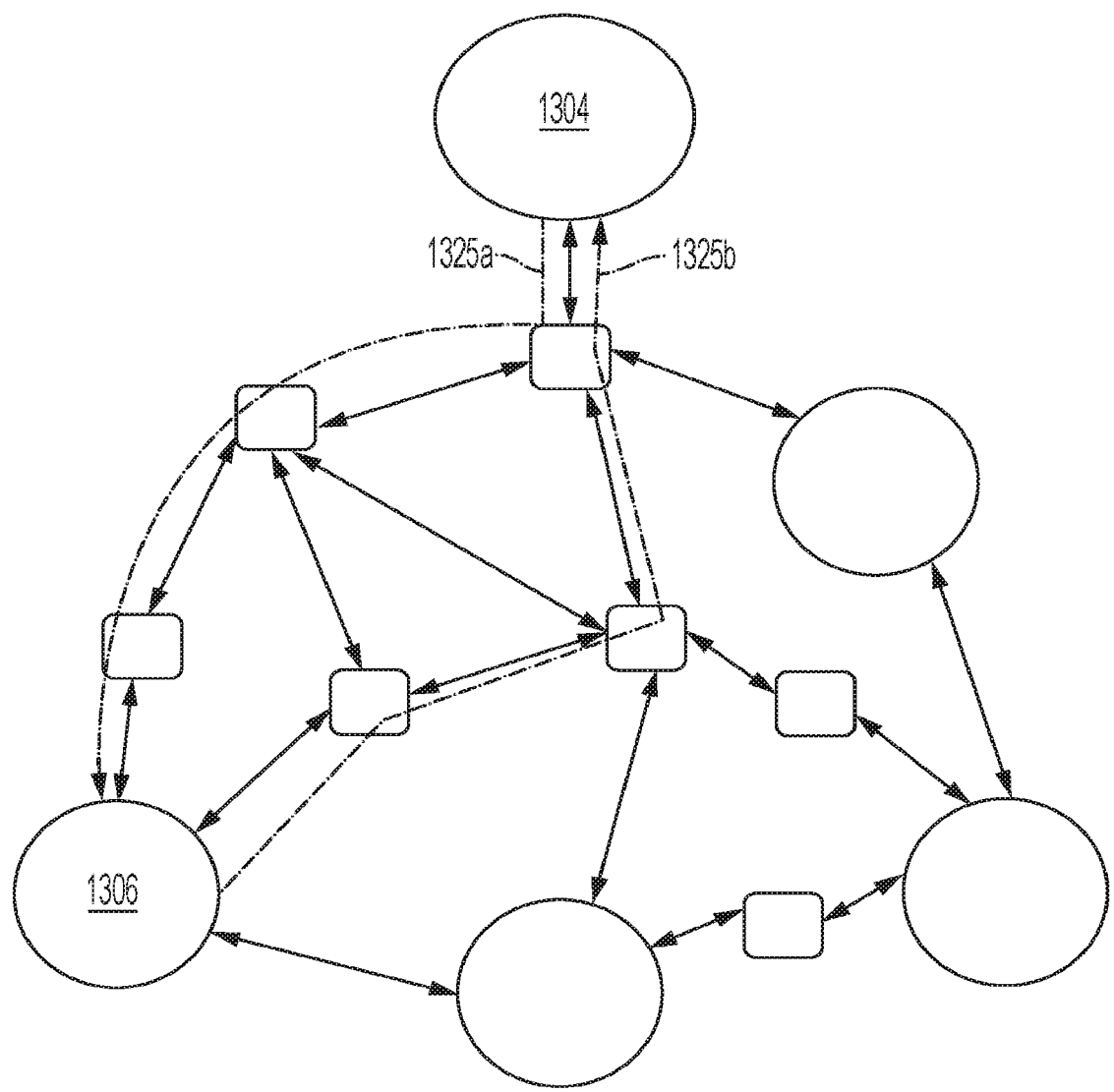
FIG. 13 depicts an aspect of multiple bidirectional message passing paths between a reference node and a free-run node each path having an asymmetric timing latency.

As disclosed above, communication message packets exchanged between a reference node and a free-run node may not always take the same message packet path. FIG. 13 depicts a communication exchange between a reference node 1304 and free-run node 1306 in which the message packet path 1325a from the reference node 1304 to free-run node 1306 (a bidirectional path) may differ from the message packet path 1325b from free-run node 1306 to the reference node 1304 (a second bidirectional path). The communication exchange between the timing reference node 1304 and free-run node 1306 may be asymmetric in latency.

Figure 14:
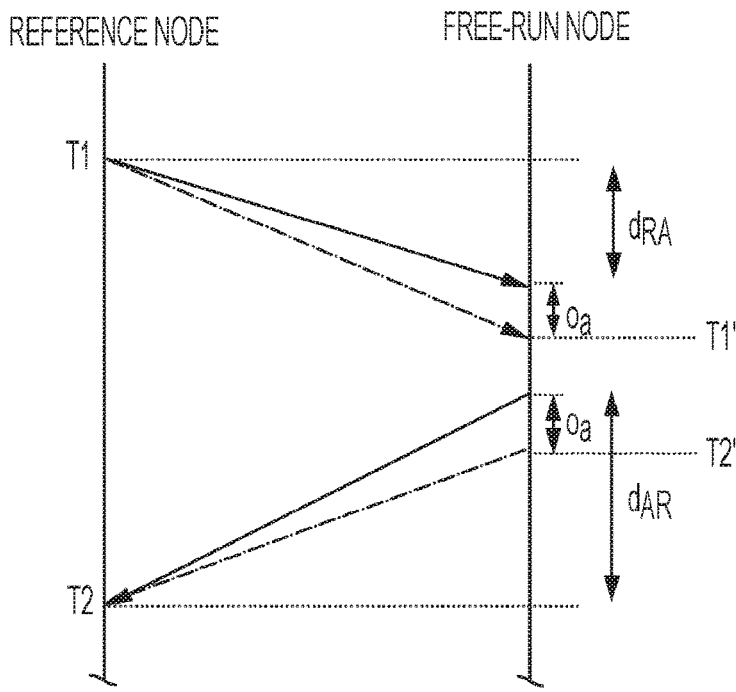
FIG. 14 depicts a message passing timing diagram for a message passed along the multiple bidirectional message passing paths each path having an asymmetric timing latency as depicted in FIG. 13.

The invention does not assume that the upstream and downstream latency of a bidirectional path are the same (i.e. symmetric); instead the latencies are assumed to be different (i.e., asymmetric). FIG. 14 depicts a timing diagram of the asymmetric communication exchange between the timing reference node 1304 and free-run node 1306 as depicted in FIG. 13. Here the symmetric assumption that dRA=dAR is relaxed and it is noted that the actual or asymmetric offset (oa) is not necessarily the same as the symmetric offset (os). Unless one of the path latencies is known a priori, or there is other information available, it is not possible to select a better time than the symmetric time, and the symmetric offset, and the round trip time (RTT) are computed according to (NTP, PTP). The offset error (oe) calculated due to asymmetry is bounded by +/−RTT/2. The example in FIG. 14 provides a case where the asymmetry results in an error between the computed symmetric time and the calculated time.

Figure 15:
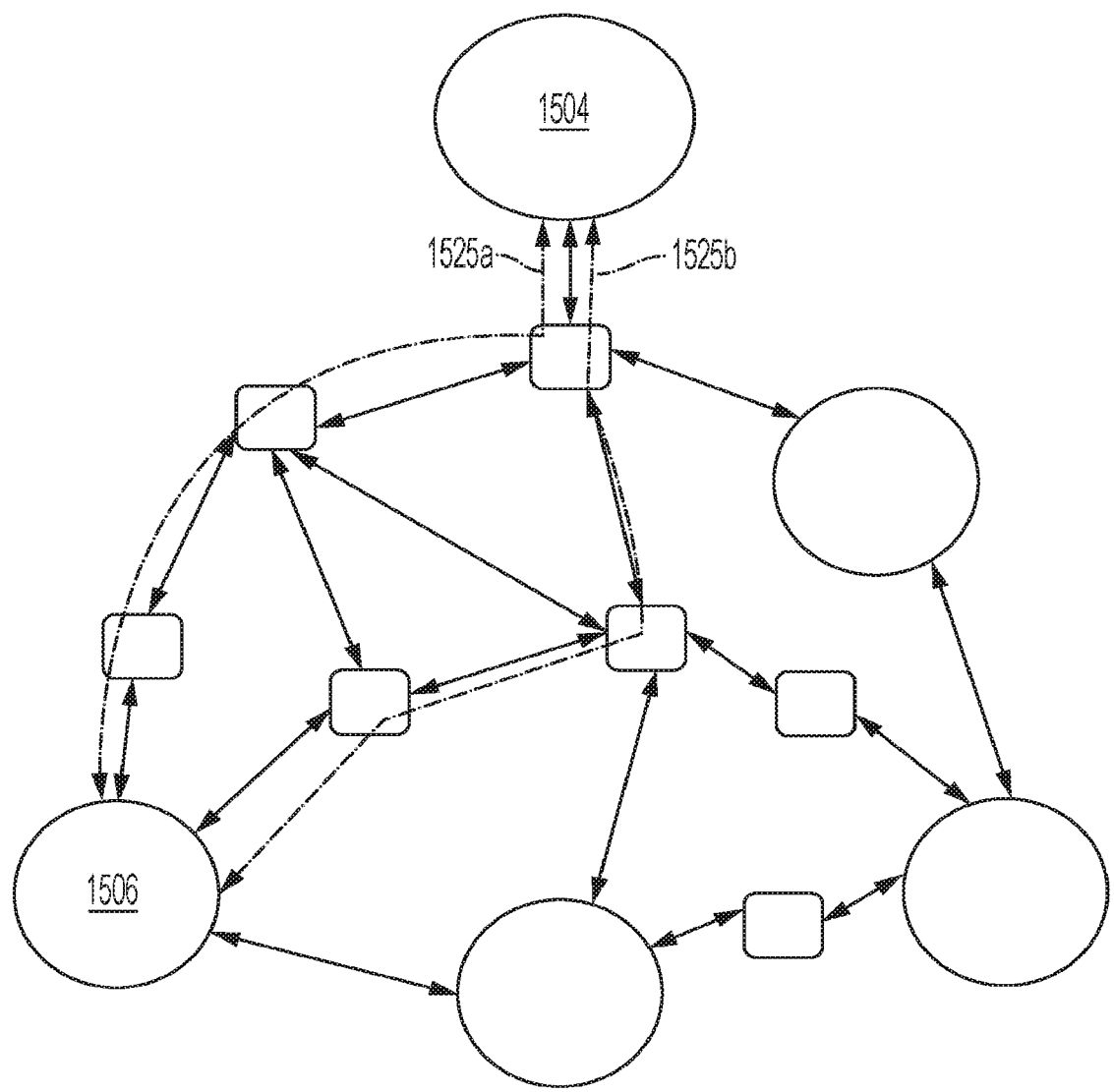
FIG. 15 depicts an aspect of multiple bidirectional message passing paths between a reference node and a free-run node.

FIGS. 11 and 13 depict examples of communication exchanges between a reference node and a free-run node. In some non-limiting examples, the message packet paths between the two nodes as depicted in FIGS. 11 and 13 may be maintained throughout the lifetime of the communication between the two nodes. It may be understood that traffic constraints, including the number and size of message packets traversing the network, may overload the transmission capabilities of one or more components of the network. In such circumstances, the network may adjust a message packet path between two nodes in response to the network traffic. FIG. 15 depicts a communication exchange between a reference node 1504 and free-run node 1506 in which a bidirectional message packet path 1525a between the reference node 1504 and free-run node 1506 may prove to be suboptimal based on traffic constraints. Thus, an alternative path 1525b may be chosen for communications between the reference node 1504 and the free-run node 1506 in order to minimize the communication time between the two nodes. The invention improves upon alternative techniques by adding the capability to select the minimum upstream transit times for all paths from free-run node 1506 to the reference node 1504 and combine these with the minimum downstream transit times for all paths from reference node 1504 to the free-run node 1506.

Figure 16:
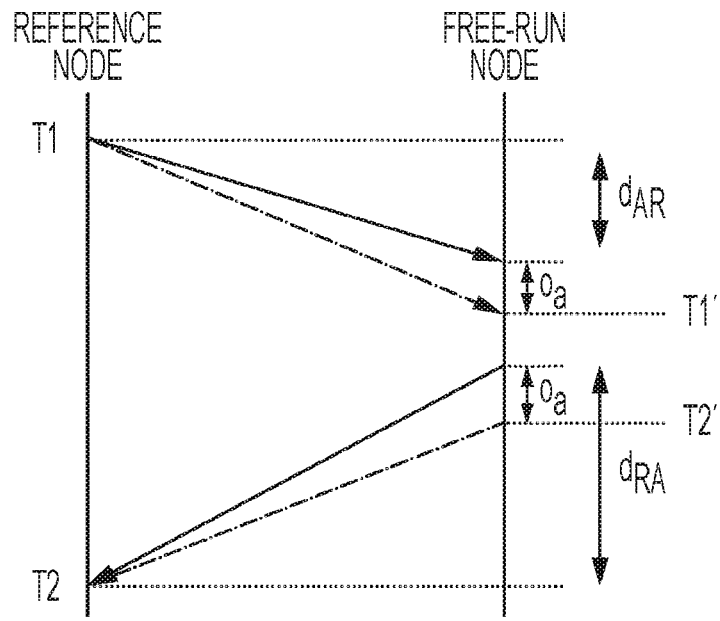
FIG. 16 depicts a message passing timing diagram for messages passed along the two bidrectional paths depicted in FIG. 15.
Figure 16:
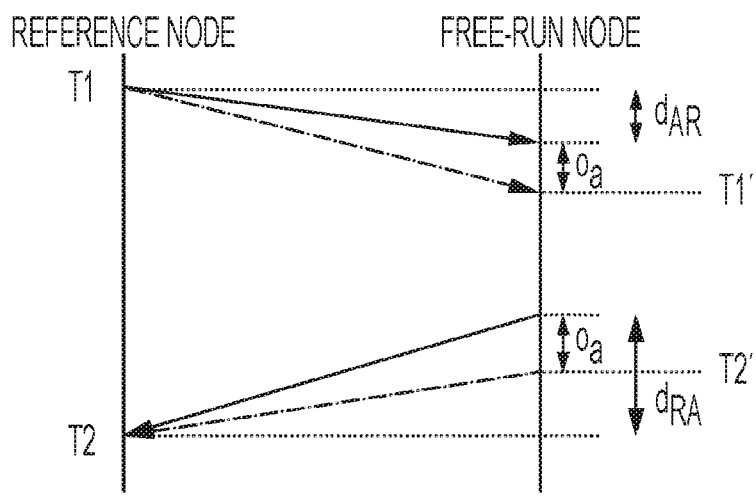

FIG. 16 depicts a message packet transfer timing diagram comparing the transit of message packets between the reference node 1504 and free-run node 1506 across path A (1525a) and path B (1525b) depicted in FIG. 15. When different paths are used for the transit times from free-run node to reference node than for reference node to free-run node the path is said to be bifurcated. The case is shown in FIG. 16 where dRA and dAR are replaced by dminRA and dminAR. Here the offset error is reduced from 1 to 0.5 and the error bound is reduced from +/−3 to +/−1.5. NTP and PTP protocols do not make use of the data from all sets of paths since they transfer packets to/from a reference over only a single path to a given reference, one that is typically chosen by the routing protocol. This path may or may not be an optimal path in terms of RTT.

Figure 24:
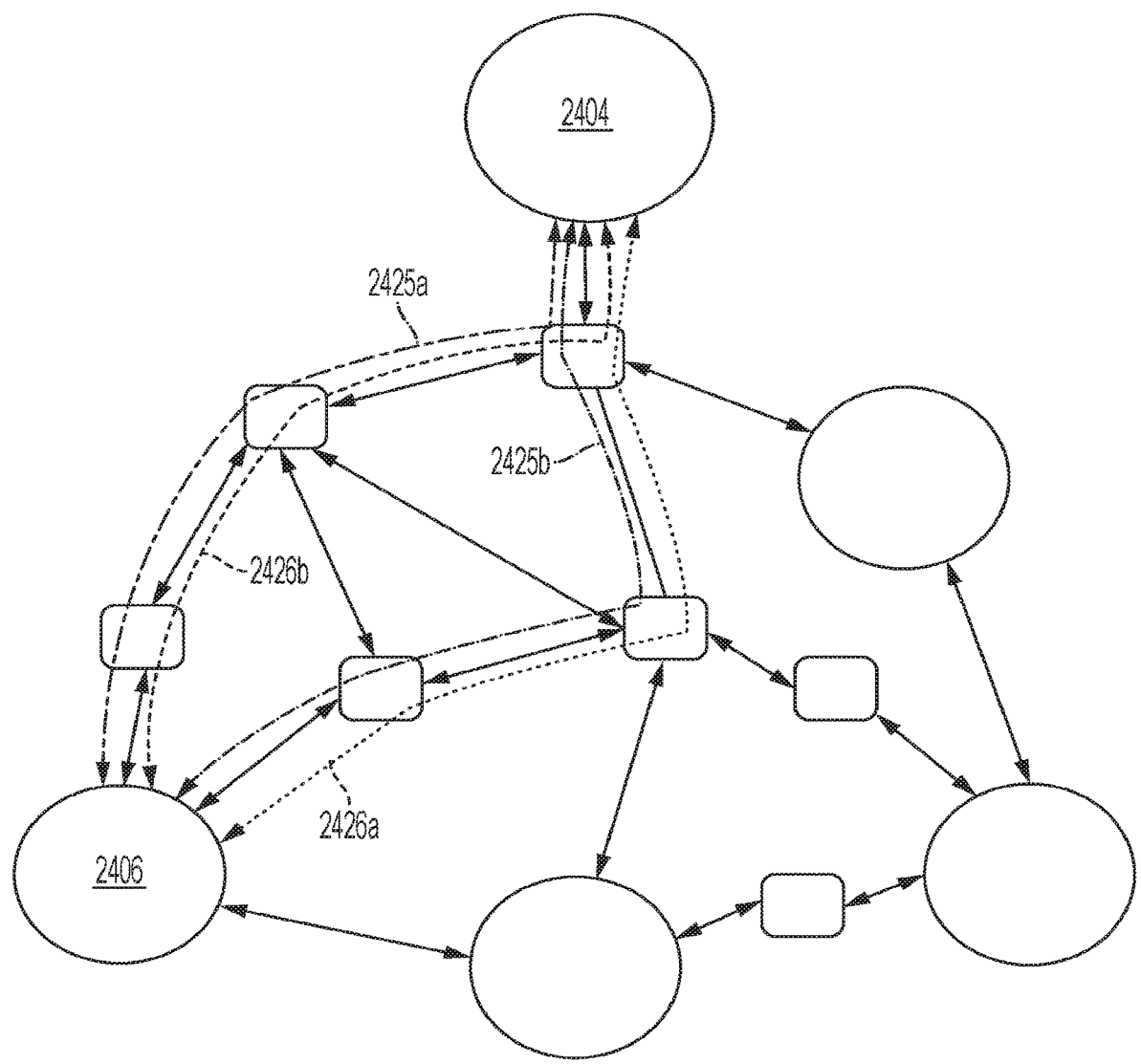
FIG. 24. Depicts an aspect of message passing paths including minimum path sets with bifurcated link selection.
Figure 25:
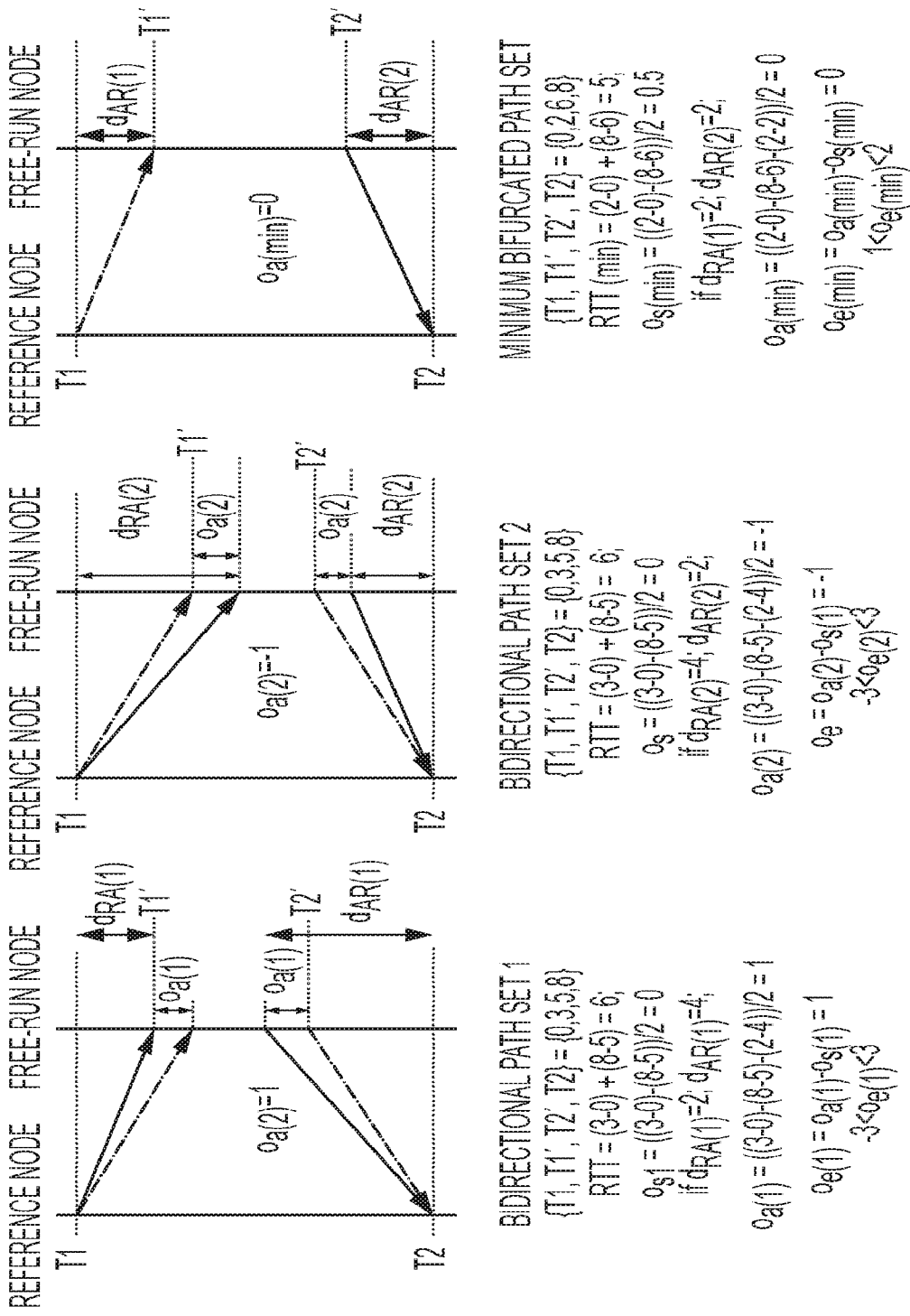
FIG. 25 depicts a message passing timing diagram for messages passed from a reference node to a free-run node along minimum path sets bifurcated link selection as depicted in FIG. 24.

FIG. 24 depicts the advantages of the invention's use of minimum latency path sets with bifurcated link selection. In this case there are two different bidirectional paths for traffic between the Reference Node 2404 and Free-Run Node 2406. The two upstream path 2425a,b and two downstream paths 2426a,b traverse different sets of packet forwarding devices. The invention allows for the selection of any upstream path 2425a,b (Free-run Node 2406 to Reference Node 2404) and any downstream path 2426a,b (Reference Node 2404 to Free-Run Node 2406), or so called bifurcated minimum paths. The traffic this is being monitored may traverse the bidirectional links in match pairs, but the metadata that is selected for the computation of the time offset is made independently per direction. Since it is not possible to know the link asymmetry, the set of paths that minimizes the worst case offset error is the one that yields the minimum effective RTT (RTTmin). FIG. 25 is a timing diagram depicting the case where the two paths between Free-run Node 2406 and Reference Node 2404 are asymmetric, but where selection of the shortest path from Reference Node 2404 to Free-run Node 2406 and the shortest path from Free-run Node 2406 to Reference Node 2404 yields a lower offset error and a tighter bound on the maximum offset error. The invention can use as many paths as are present in the metadata between Free-run Node 2406 and Reference Node 2404 and is not limited to only two. Alternative techniques do not have the capability to use bifurcated minimum paths.

Figure 17:
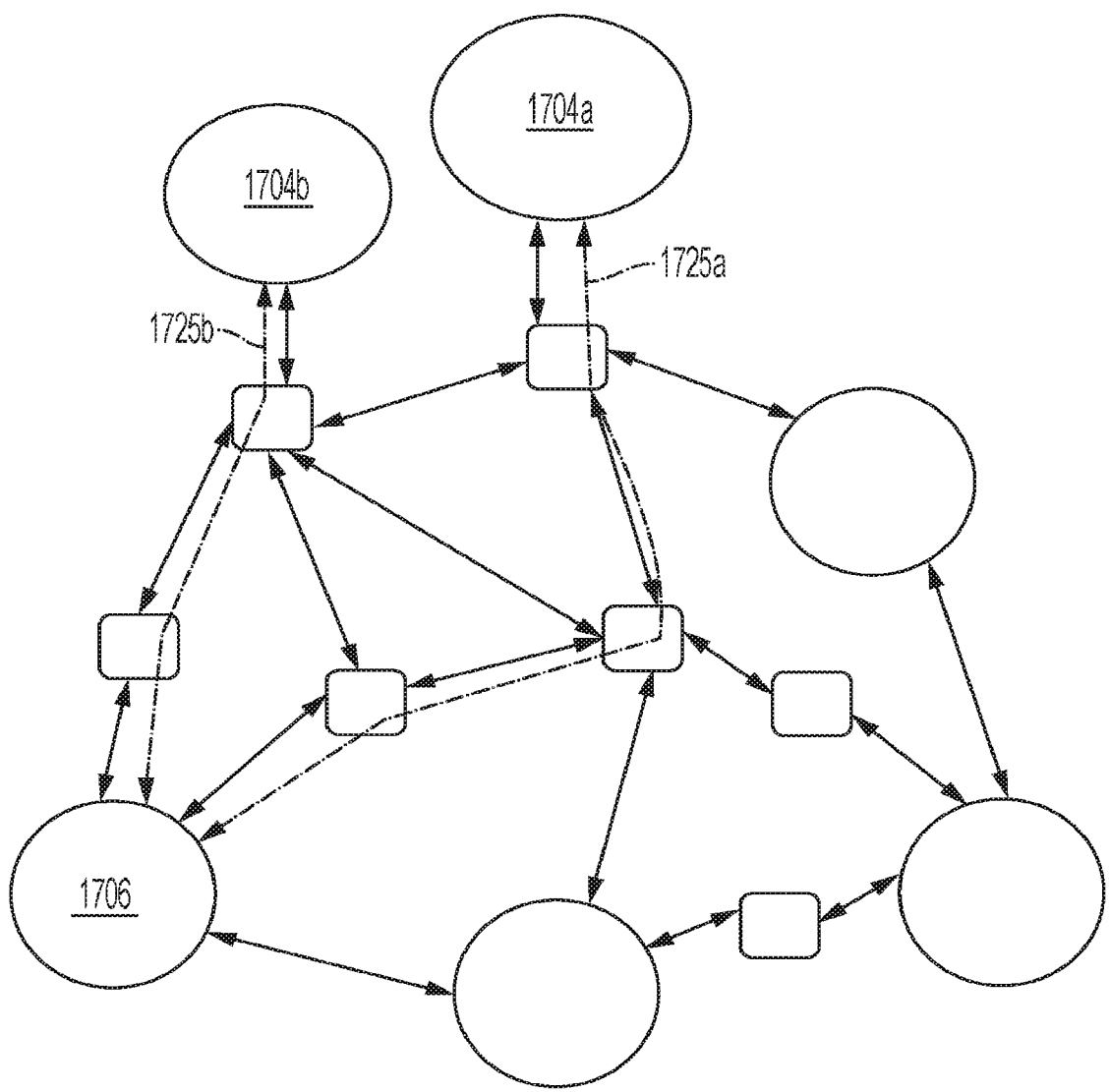
FIG. 17 depicts an aspect of multiple bidirectional (a)symmetric message passing paths between two fungible reference nodes and a free-run node.
Figure 18:
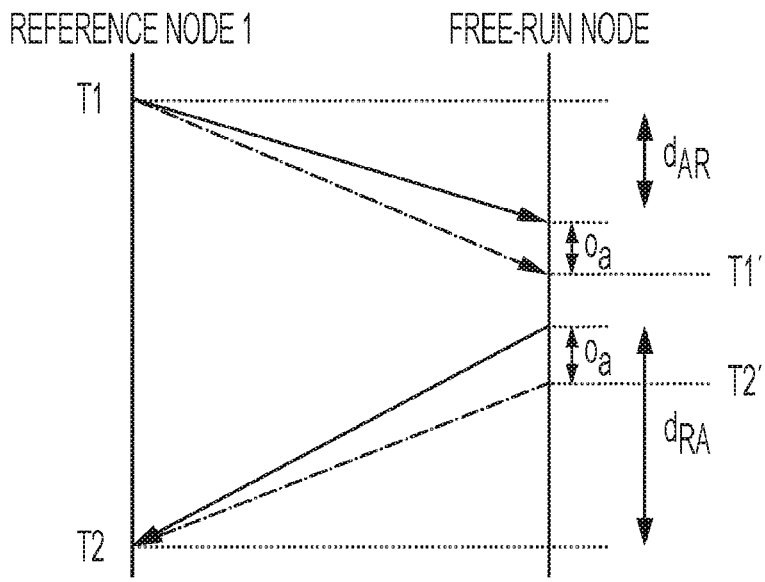
FIG. 18 depicts a message passing timing diagram for messages passed along the two bidirectional (a)symmetric paths depicted in FIG. 17.
Figure 18:
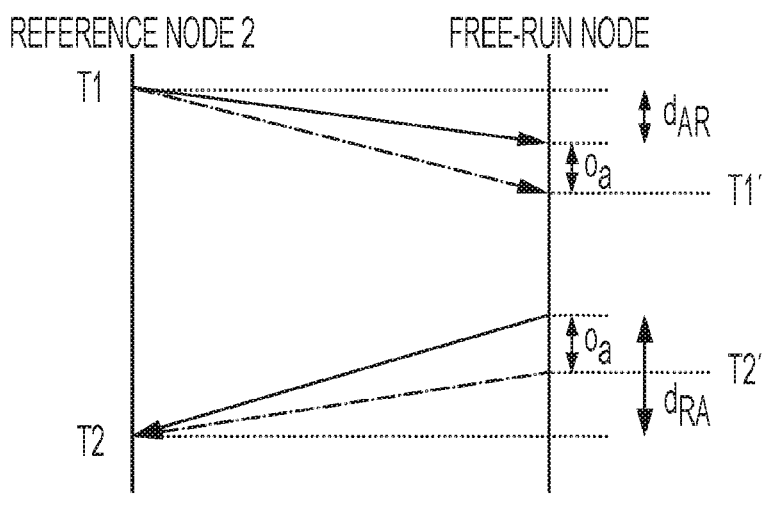

FIG. 17 depicts a first communication exchange 1725*a* between a first reference node 1704*a* and free-run node 1706, and a second communication exchange 1725*b* between a second reference node 1704*b* and free-run node 1706 in which the two reference nodes 1704*a,b* have fungible cocks. FIG. 18 depicts a message packet transfer timing diagram comparing the transit times of communication packets between the first reference node 1704*a* and free-run node 1706, and the second reference node 1704*b* and free-run node 1706. Here we find that second reference node 1704*b* provides a more symmetric result with a tighter error bound on the offset than the paths to first reference node 1704*a*. In general, any set of minimal paths can be selected and could be bifurcated to include an upstream path from free-run node 1706 to first reference node 1704*a* and downstream path from second reference node 1704*b* to free-run node 1706. As before, NTP and PTP can not take advantage of bifurcated paths to multiple references.

Figure 19:
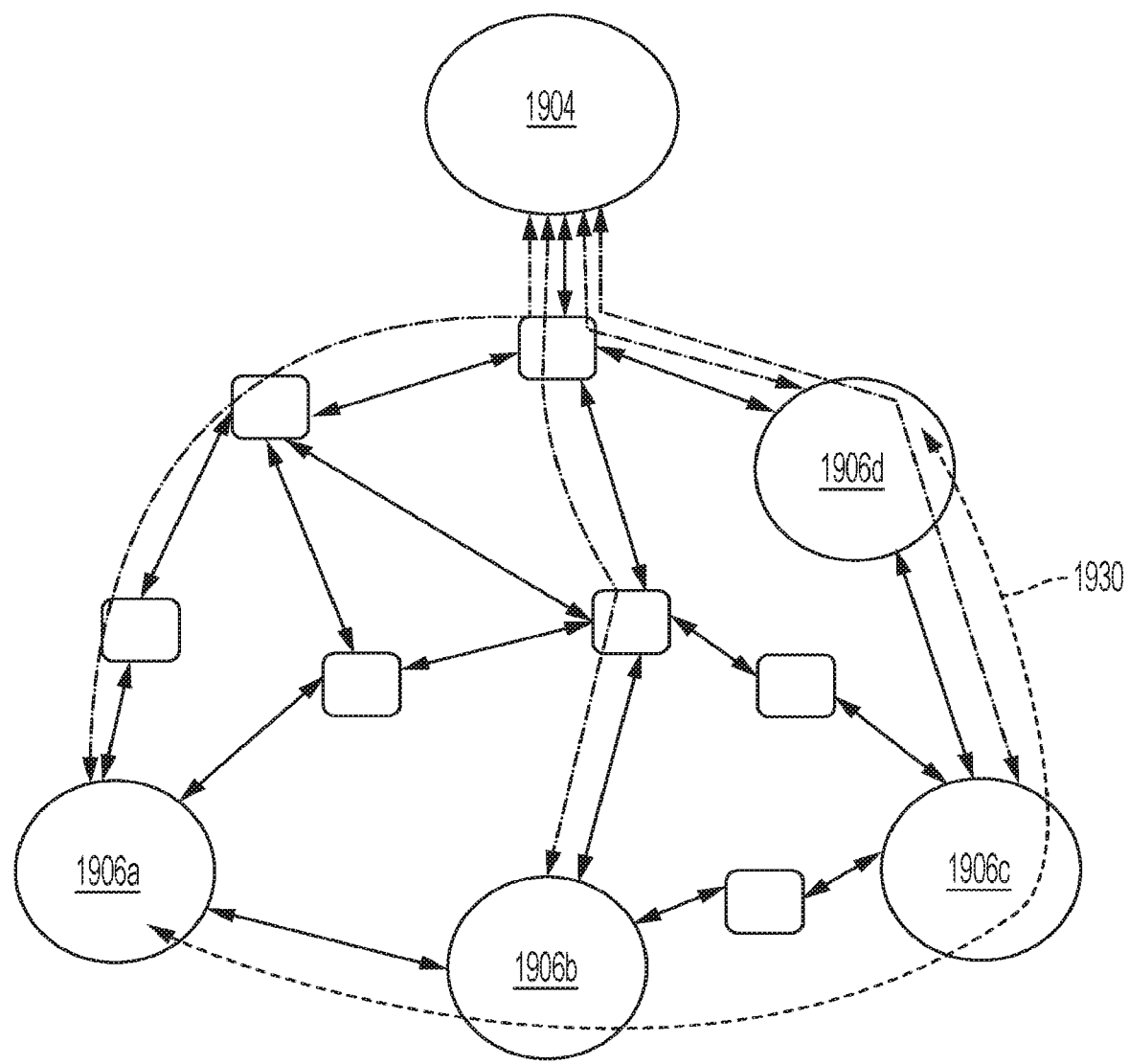
FIG. 19 depicts an aspect of multiple message passing paths including paths between two free-run nodes.

FIG. 19 depicts communication exchanges between a reference node 1904 and a plurality of free-run nodes 1906*a-d*. Additionally, FIG. 19 depicts a communication exchange between free-run node 1906*a* and free-run node 1906*d*. As depicted in FIG. 19, a message packet may traverse a message packet path 1930 comprising free-run node 1906*a* to free-run node 1906*b* to free-run node 1906*c* to free-run node 1906*d*. Each free-run node 1906*a-d* initially synchronizes to its reference node(s) (for example 1904). This results in an offset estimation with accuracy as determined by the minimum path set. It may be recognized that the timestamps for an exchange of message packets between free-run node 1906*a* and free-run node 1906*d* along message packet path 1930 may result in an apparent lack of causality because the timestamp compensation associated with each of the free-run nodes have been for its minimum path set that does not necessarily include the bidirectional path 1930. As a result, compensated metadata timestamps published by each of the nodes may lead or lag with respect to the metadata timestamps by the other nodes 1906*a-d* in path 1930.

The invention improves upon alternative systems in its ability to use known routing path information, e.g., routing tables, or by observing the Time To Live (TTL) fields of packets as they traverse a network. As an example, both Multi-Protocol Label Switching (MPLS) and Internet Protocol (IP) have TTL fields. As the packet is switched (MPLS) or routed (IP), the TTL field is decremented. This helps to ensure that packets are not forwarded endlessly when routing errors occur. It is always the case that a packet seen at a point with a higher TTL was seen before the selfsame packet at a different point with a lower TTL. This information can be used to ensure timestamp causality among a set of nodes that the packet transited. This path need not include the reference node in order to improve the timing of the nodes along the path. It is possible to adjust the offset times at each node such that all packet forwarding paths have timestamps with causal order. Further all offsets must be within RTTmin/2 for all paths among and between all nodes and all reference nodes. The set of offsets that achieve causality are likely to result in upstream or downstream asymmetry as is appropriate. Alternatives (NTP, PTP) presume symmetric delay resulting in offset errors and packet timestamps that are non-causal with respect to TTL. FIG. 19 shows the network with a bidirectional path 1930. Note that the reference node 1904 is not included in this path.

Figure 20:
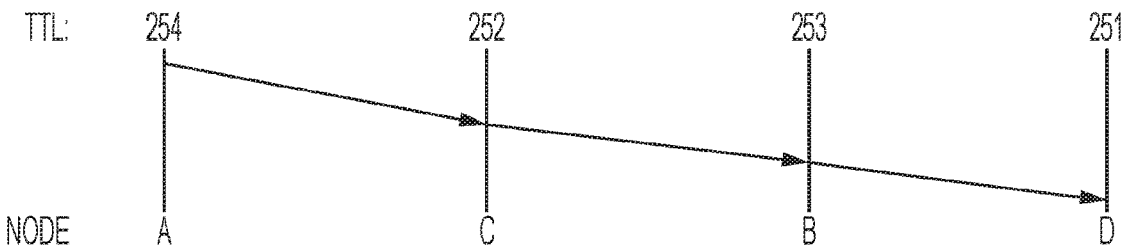
FIG. 20 depicts a method of correcting packet time-stamp data using node topology.
Figure 20:
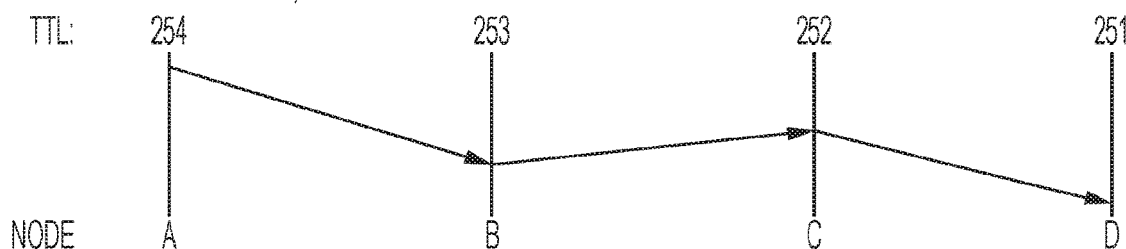
Figure 20:
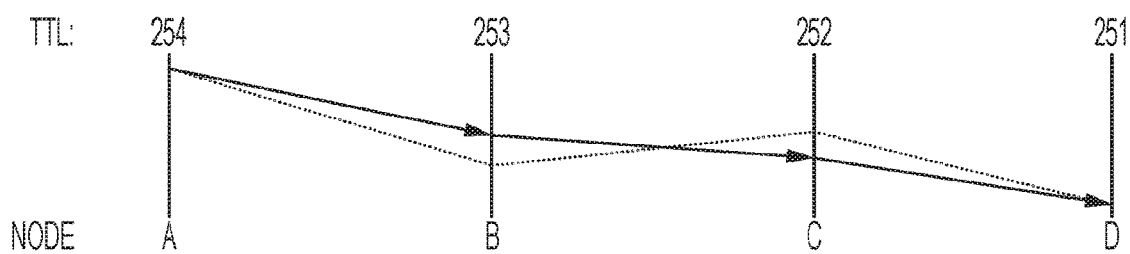

Considering the free-run node 1906*a* to free-run node 1906*d* direction only in FIG. 19, FIG. 20 shows the case where ordering by timestamp results in a conflict with the TTL field. Thus, if only the time-stamp is considered, FIG. 20, top, indicates a message packet path through free-run nodes 1906*a* (A) to 1906*c* (C) to 1906*b* (B) to 1906*d* (D), leading to a case of a non-causal message path. This is in conflict with the TTL field which property orders the path as free-run nodes 1906*a* (A) to 1906*b* (B) to 1906*c* (C) to 1906*d* (D) (FIG. 20, middle). The clocks for free-ran nodes 1906*b* (B) and 1906*c* (C) may be compensated by noting the proper ordering (FIG. 20, bottom). In this manner, time offsets at nodes 1906*b* (B) and 1906*c* (C) may be adjusted, within their acceptable RTTmin/2 range, such that the resulting compensation yields timestamps that are causal with respect to the TTL fields.

Figure 21:
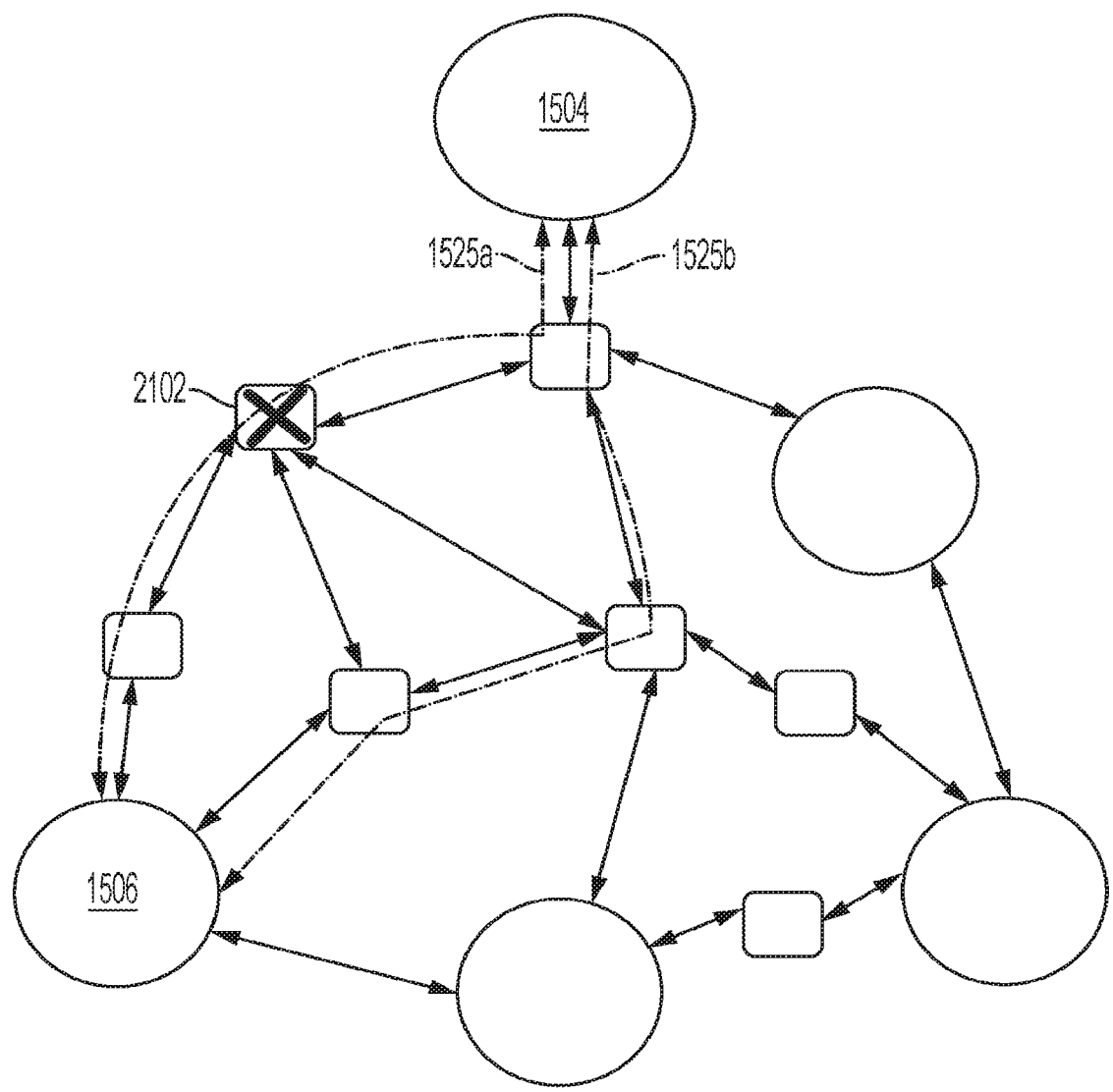
FIG. 21 depicts message passing in a network having a network component failure.

As disclosed above, message packet traffic constraints, including the number and size of message packets traversing the network, may overload the transmission capabilities of one or more components of the network. FIG. 15 depicts an example of such a configuration, in which the network may adjust a message packet path between two nodes in response to the network traffic. Often these reconfigurations result in new delays in one direction or the other and with different asymmetry than for previous path selections. FIG. 21 shows the case where the free-run node 1506 was previously using path set 1525*a* to compute time. Upon failure of a network element or link 2102, the system moves to use path set 1525*b*. However, the compensation does not solely use the new set for computation of the phase offset, but rather computes the offset of path set 1525*b* relative to the offset for path set 1525*a* and deducts that from compensations based on path set 1525*b*. In this way there is no instantaneous phase jump due to the network reconfiguration. This is appropriate since the node's time has not actually changed. The systems and methods herein disclosed ensure that the node's effective time does not experience a phase jump merely because the path changed. Alternative systems may be very prone to step changes in phase estimate due to such network reconfigurations. In an alternative example, one or more of the network components may fail.

Figure 22:
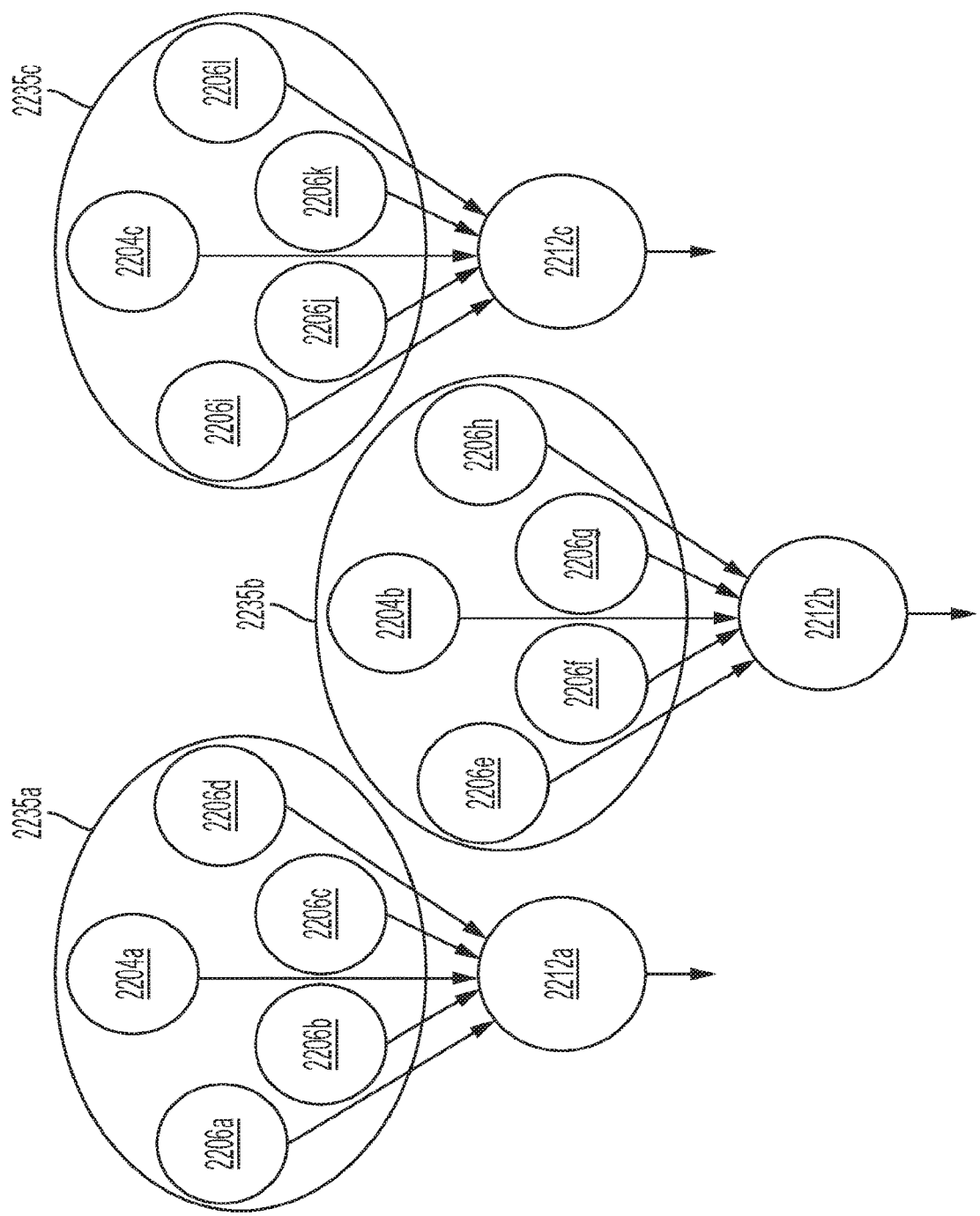
FIG. 22 depicts message passing time determination in multiple subgroups of a network.

It may be recognized that computer networks may vary in the number of nodes and communication components. In some smaller networks, such as those depicted in FIGS. 4, and 8-10, the number of free-run nodes, reference nodes, and aggregators may all work together in a unified manner. However, some computer networks may be sufficiently large and complex, that time compensation among the nodes may become computationally intensive. Such larger networks may operate more efficiently if the components, including free-run nodes, multiple reference nodes, and multiple timing aggregators, are sub-divided into a hierarchy of subgroups. FIG. 22 depicts an example of such a network that is sub-divided into three subgroups.

Figure 23:
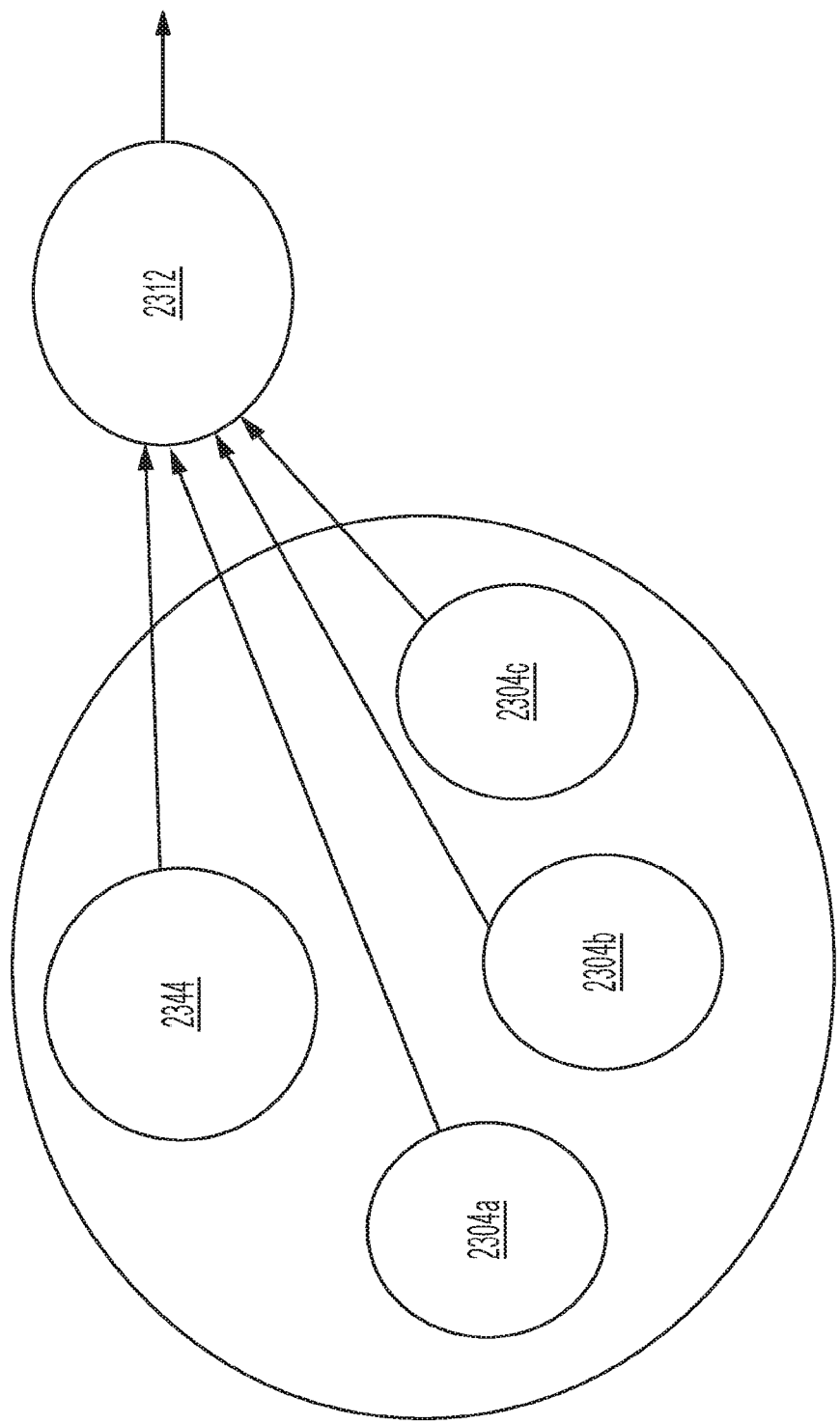
FIG. 23 depicts timing aggregation among a plurality of subgroups of a network.

A network of nodes can be decomposed into timing subgroup 2235*a-c*. Thus, timing subgroup 2235*a* includes a reference node 2204*a* and free-run nodes 2206*a-d*, timing subgroup 2235*b* includes a reference node 2204*b* and free-run nodes 2208*e-h*, and timing subgroup 2235*c* includes a reference node 2204*c* and free-run nodes 2206*i-l*. The metadata from each timing subgroup 2235*a-c* may be published to its own timing aggregator 22128-*c*, respectively. As depicted in FIG. 22, each subgroup 2235*a-c* can compute and compensate for the node docks time offset with reference to the chosen subgroup reference node(s) (2204*a-c*, respectively) such that there is consistency in between all elements of the subgroup. The local reference nodes 2204*a-c* need not be globally synchronized. This procedure is repeated for the subgroup reference nodes 2204*a-c* (or sub groups of these) so that these nodes timestamps are compensated to the group reference. These subgroup compensations are also added to each element of its subgroup to bring these nodes' timestamps to the group reference. FIG. 23 depicts an additional time compensation layer in which the metadata from all or a portion of the reference nodes 2304*ac* may be published to a higher-order timing aggregator 2312. This process can be done in a hierarchical fashion until at some point all nodes and timestamps are compensated to one or more global references 2344.

Figure 26:
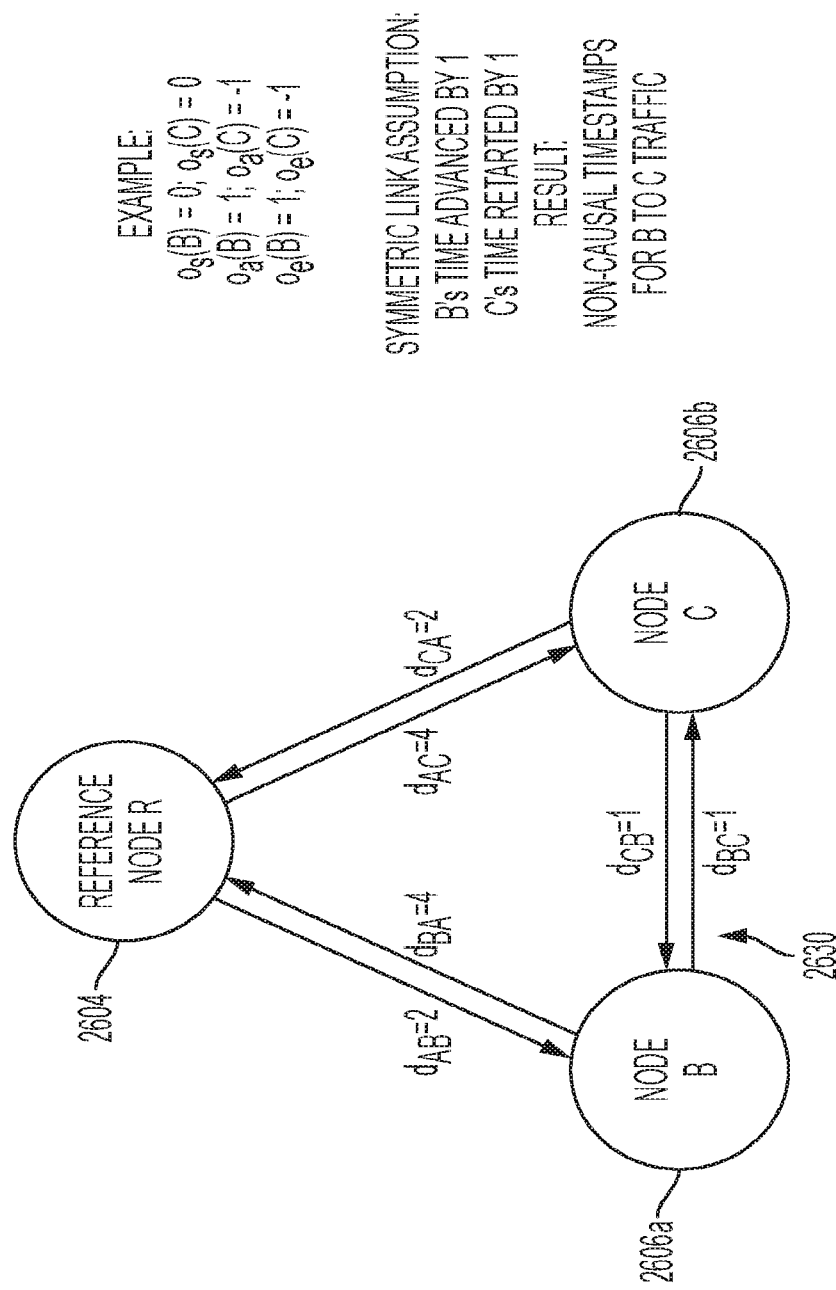
FIG. 26 depicts an aspect of message passing paths for messages passed from a reference node to two free-run nodes.
Figure 27:
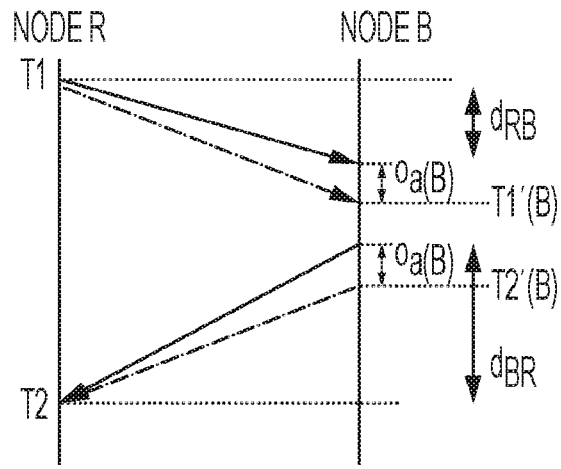
FIG. 27 depicts a message passing timing diagram for messages passed from a reference node to two free-run nodes as depicted in FIG. 26 having path asymmetric latency in which symmetric latency is assumed.
Figure 27:
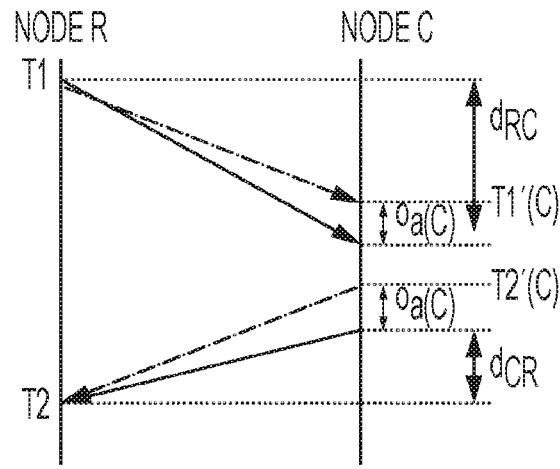
Figure 28A:
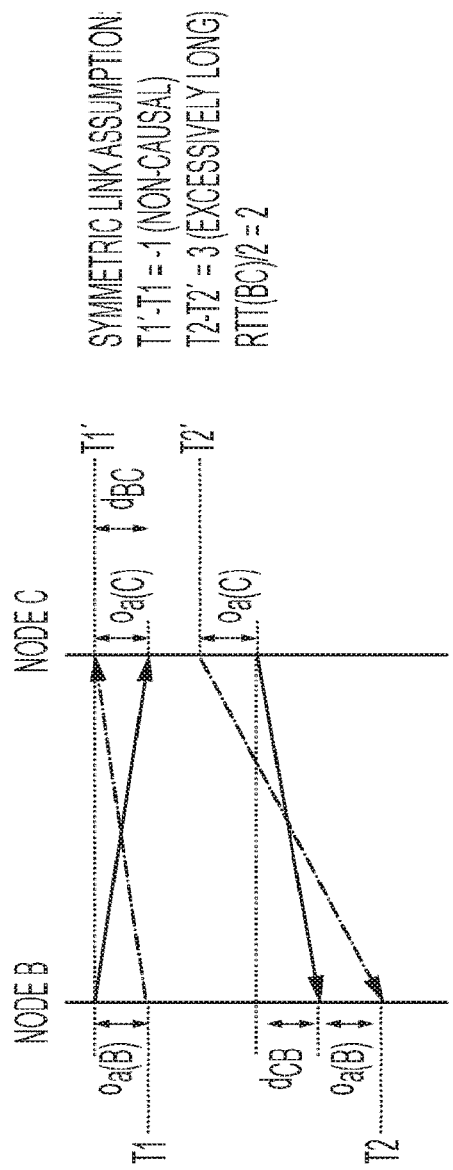
FIG. 28A depicts a message passing timing diagram for messages passed between the two free-run nodes as depicted in FIG. 26 in which a symmetric link assumption leads to non-causal timestamps.
Figure 28B:
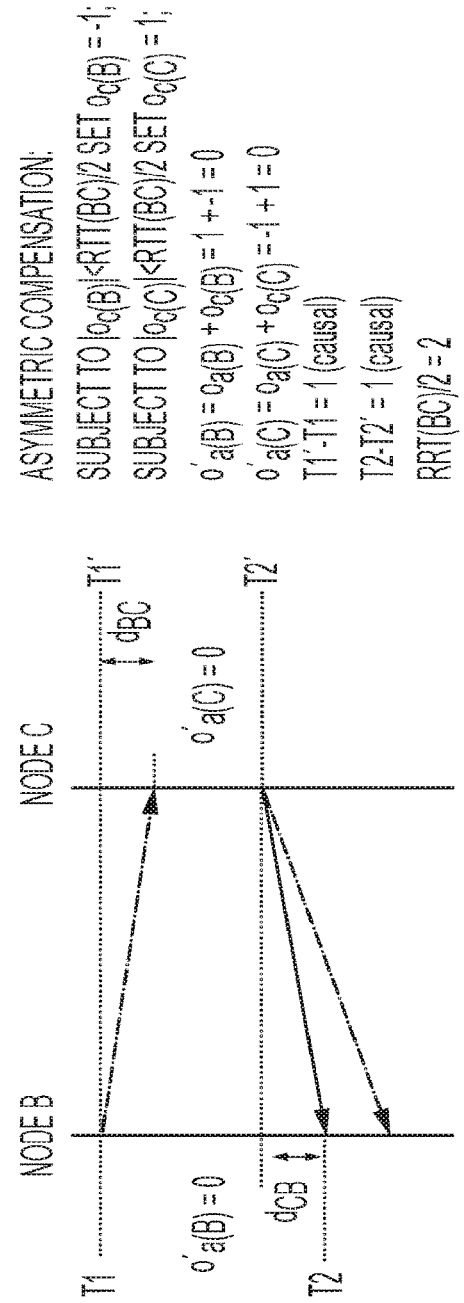
FIG. 28B depicts a message passing timing diagram for messages passed between the two free-run nodes as depicted in FIG. 26 in which asymmetric compensation leads to causal timestamps.
Figure 29:
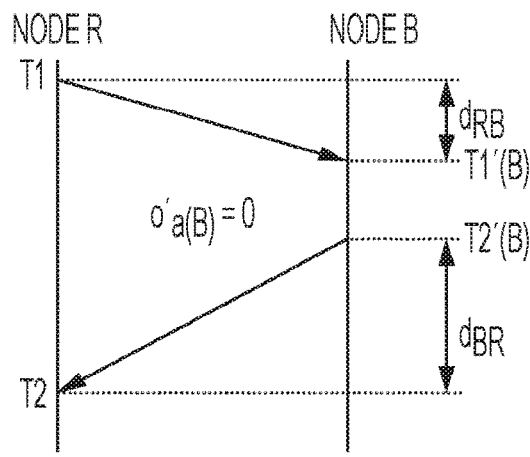
FIG. 29 depicts message passing timing diagrams for messages passed between the reference node and each of two free-run nodes as depicted in FIG. 26 in which asymmetric compensation reduces offset error.
Figure 29:
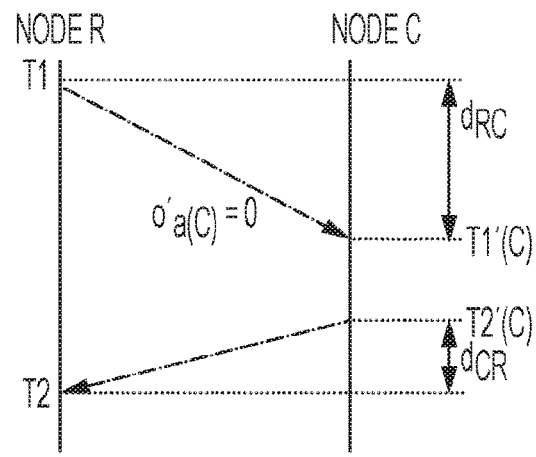

FIG. 26 depicts a situation in which the symmetric link assumption leads to non-causal timestamps for non-reference node paths. In this case, there are two free-run nodes, 2606*a* and 2606*b*, both referring to the same reference node 2604. There is also a path 2630 between free-run node 2606*a* and free-run node 2606*b*. Using the standard symmetric link assumption, the offset error for free-run node 2606*a* makes the node's effective clock 1 ahead of the true time. Similarly, the free-run node 2606*b* effective clock is set to be 1 behind real time. This results in a non-causal result for packet timestamps for the free-run node 2606*a* to free-run node 2606*b* along path 2630, effectively make them appear to be going backwards in time. FIG. 27 depicts the timing diagrams and calculation of the free-run node offsets given the assumption of symmetric paths for the network depicted in FIG. 26. FIG. 28A shows the result of the offset errors due to asymmetry and the resulting lack of causality for the B to C path. It is the case however, that the invention can take into account the knowledge of the path and enforce causality. As depicted in FIG. 28B, this is done by determination of asymmetric offset compensation, oc, for each node. These offsets can be chosen as long as they do not exceed the +/−RTT/2 limit for each node, as depicted in FIG. 29. In this case, the RTT/2 limit is +1-3 for each path and a selection of oc(B)=−1 and oc(C)=1 results in a causal result and zero offset error. In practice, the selection of the offset compensation for each node can take advantage of paths to multiple references and may be bifurcated, etc. The choice itself can be made algorithm through an iterative parametric search, etc. There is no guarantee that the asymmetry compensation is perfect, only that it ensures causality for all paths that have metadata between the set of free-run nodes. The network system disclosed above, and methods that may be derived therefrom, may be beneficial in relation to other computer network timing considerations.

The invention can select from all or a subset or subsets of packets to determine time, phase and frequency, potentially with different subsets used for time, phase, and/or frequency.

Packet subsets may be selected by any of the following:
  i. size; since size is a predominant factor In latency and jitter;
  ii. quality of service (QoS) markings; since QoS is a predominant factor in latency and jitter;
  iii. IP Protocol; since well known protocols are known to be forwarded differently in networks;
  iv. Source and/or Destination ports; since well established ports are used for services that are more or less likely to be treated preferentially;
  v. application layer; since certain applications, such as RTP, have real time performance requirements and are treated preferentially in networks.
  vi. generically by n-tuple or flow, since increasing numbers of network elements discriminate by flow.

Network packets contain a number of fields or sets of bits with meaning, each field being referred to as a "tuple" and n fields as an "n-tuple". N-tuples can include such fields as IP source and destination address, IP protocol type, TCP and UDP source and destination ports, various Class of Service indications and if present, Virtual LAN (VLAN) tags and MultiProtocol Label Switch (Paths), etc. Certain packets also have application layer information fields, such as Real Time Protocol (RTP). The set of packets matching a desired set or range of the n-tuples are referred to as a "flow". Flows may be of limited duration, periodic, bursty, and/or long-standing. Timing metadata contains the fingerprint, a timestamp, n-tuples of the packet or a flow Identification, and per packet Information such as time to live, and QoS markings. Packet size or length is also included.

Packet size has a huge impact on the network transit delays. Store and Forward delays and dispersion processes in network elements result in transit delay that varies based on packet size. Large packets have the largest store and forward delays, but with the least packet delay variation. Small packets have the least store and forward delays at the expense of the most packet delay variation. The invention provides the ability to choose timestamps from large packets to provide stable phase and frequency, whereas the timestamps from the smallest packets provide the best measures of RTT and thus better limit the phase offset error. Alternative techniques used relatively small packets of only one fixed size.

Explicit QoS markings, e.g., IP Differentiated Services Code Point (DSCP), MPLS experimental bits (EXP) or IEEE802.1q Priority Code Points (PCP) can be used to preferentially select metadata by the time determination algorithm. It is well established that network elements favor higher priority traffic such as Expedited Forwarding (EF) traffic resulting in less latency (RTT) and PDV (jitter) for these packets. The invention allows for preferential selection of metadata from packets based on the QoS markings, for instance to preferentially select metadata for EF marked packets. Alternative techniques use only specific timing packets and these packets may or may not be marked at the highest levels. Therefore the invention has more capability to achieve better performance.

Network elements can also often be configured to treat traffic preferentially by flow, or a subset of the n-tuples as noted above. In these case the preferential treatment may not be explicit as for QoS markings, but configured policies in the network elements. Flows that are treated more favorably than others should experience less delay (RTT) and jitter (PDV). The invention provides the ability to preferentially select flows based on knowledge of policy, or based on observed RTT values. Alternative techniques use only specific timing packets and these packets may or may not be treated favorably with respect to packets belonging to other flows. Therefore the invention has more capability to achieve better performance and experience less latency and jitter.

The invention can use network load, throughput and link utilization to estimate the relative value of metadata from packets traversing a particular ink to the time determination algorithm. It is well known that heavily utilized network links can suffer excess latency and PDV. Since the timing determination algorithm has access to link utilization either directly by computation, or indirectly via external sources, the algorithm can choose to include or exclude the timestamps for packets traversing the link, or choose to weight the data from the link more or less respect to other links.

The invention can compensate for transit delays through packet forwarding nodes that share a common local dock. PTP solutions include the possibility for Transparent Clocks wherein the delays experienced by a packet transiting a network element are compensated by use of a local elapsed time clock embedded in the PTP packet. The PTP packet is timestamped upon Ingress to the network element and upon egress from the network element and an elapsed time or residence time value is added to a field in the PTP packet. The residence counter can be a free running dock since only the elapsed time is computed and no reference is needed. For those network elements that support transparent dock, the PTP servo algorithm may serve to subtract the residence time from the timing computations. PTP Transparent docks are typically implemented in the hardware (network interface chips) of the network element. Residence time compensation is only possible for specific PTP packets. NTP does not include a transparent dock mechanism for compensation of residence delays. The invention provides for transparent clock functionality, but based on metadata for up to every packet, regardless of size, priority, protocol, etc. Packet metadata is created at ingress and egress of the Packet Forwarding (PF) (physical or virtual switch, router, load balance, firewall, etc.). The timing aggregator knows the topology of the node OP's and can deduct intra-node residence times from the timestamp compensation algorithm mechanism for all of the packets (not just PTP). The invention does not require special hardware capability in the network element.

The invention provides for interpolation of timestamp compensation between timing updates. Timestamp compensation calculations are performed on a periodic basis, perhaps once per 300 s. The compensation values includes a phase offset and a frequency offset (phase/time). Once determined, the offsets are applied to the raw timestamps in the metadata in order to bring those timestamps for that particular node into the reference timebase. Raw timestamps from the freerun node will continuously drift between from the reference since its clock is free running. For events that occur between updates, the timestamps compensation is computed as follows:

$$Tc = Tu + To + Fo*dT;$$

where Tc is the compensated time, Tu is the uncompensated Timestamp, To is the phase offset Fo is the frequency offset, and dT is the elapsed time since the last update of the offset values. It is possible to calculate timestamps using higher order terms, e.g. a second order or possibly polynomial or functional curve fit curve as a function of elapsed time since the last update.

This invention can initiate the sending of packets at a rate sufficient to maintain timing for the nodes in question. At very low link utilization, packets may be very rare, perhaps lower than 1/s. In these cases there may be a need to synthesize packets between the node and the reference in order to maintain the accuracy of the time determination algorithm. These packets can be generated or initiated by the node's metadata process, or the timing aggregator process and may be a separate process or part of the metadata process.

The invention does not require the distribution of time to the nodes. However, there is nothing precluding the distribution of time to the nodes. Therefore the invention can also be used to synchronize the network nodes and, for all of the aforementioned advantages, can do so with greater accuracy and stability than existing NTP and PTP solutions.

Disclosed above are a number of topologies of networks of computerized devices. Such networks may include nodes and additional components for transmitting communication packets among and between the nodes. In general, a node may include any computerized device that may originate a communication packet or be the end recipient of such communication packets.

Nodes may comprise any number or combination of computerized devices including, but not limited to, servers, desktop computers, laptop computers, tablet computers, and smart phones. The additional components may include devices that may be used to pass communication packets from one device to another (including nodes). Such additional components may comprise any number or combination of computerized devices including, but not limited to, servers, switches, routers, hubs, modems, bridges, and repeaters. It may be recognized that, in some network topologies, nodes may also function to pass communication packets from one device to another. The network may include any number or combination of such computerized devices. The network may include one or more subgroups or subnetworks of any number or combination of such computerized devices. The network may include any combination of individual computerized devices and one or more subgroups or subnetworks of such computerized devices.

As disclosed above, a network topology may include one or more timing reference nodes and one or more timing aggregators. It may be understood that any device comprising a network node may be a timing reference node. It may also be understood that the aggregator may be a separate device or may be one of the nodes in the network. There may be any number of timing reference nodes and/or aggregators. Regardless of the topology of the computerized devices that comprise a network, it may be understood that any one or more of the nodes may function according to the methods discloses herein. Such functions may include, without limitation, one or more of receiving one or more communication packets, forming a communication packet comprising metadata related to the one or more communication packets, publishing the metadata packets to one or more aggregators, receiving timing compensation data from the one or more aggregators, and adjusting a clock or timing value based on the timing compensation data. Further, it may be understood that any one or more of the aggregators may function according to the methods disclosed herein. Such methods may include, without limitation, one or more of receiving metadata from one or more nodes, calculating an aggregated packet of metadata, calculating one or more timing compensation values, and determining one or more minimal paths between any number of network nodes.

Figure 30:
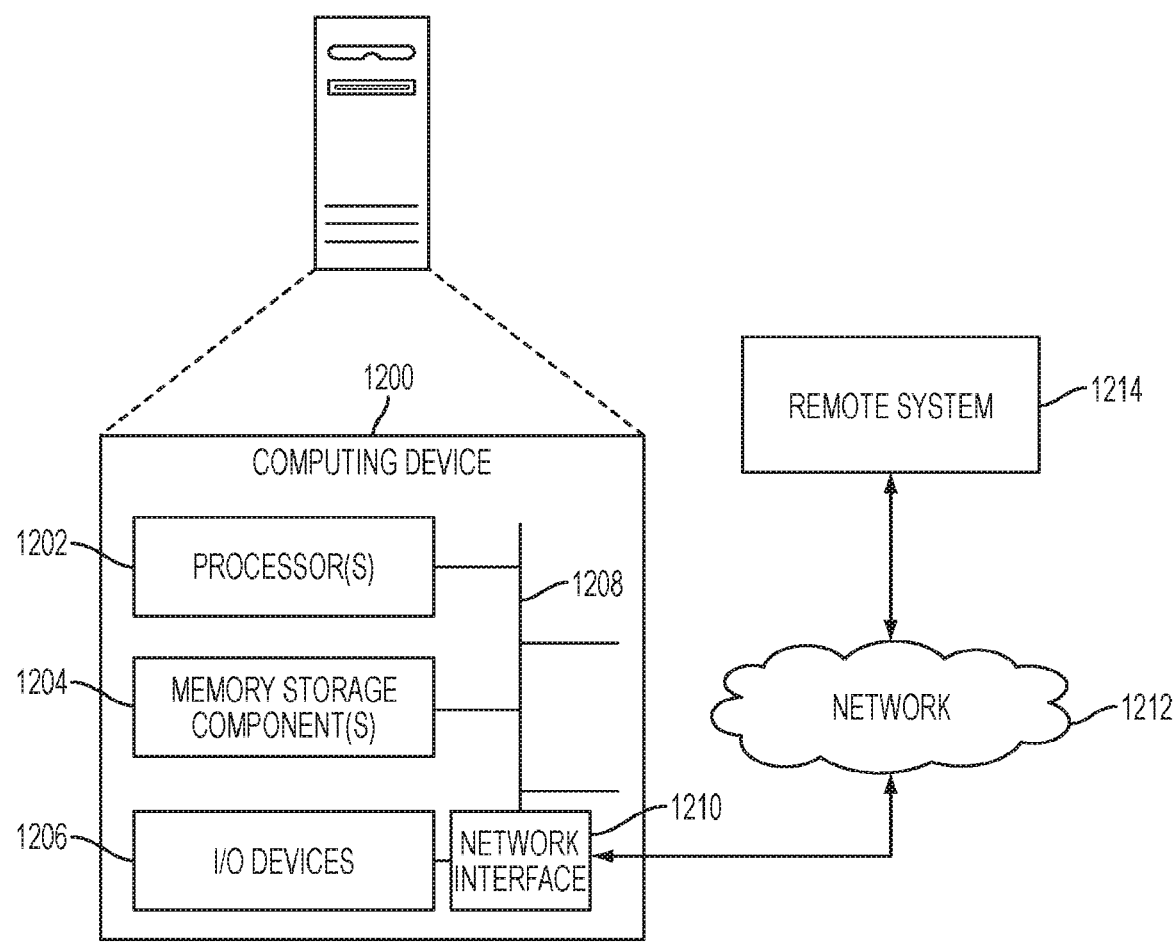
FIG. 30 depicts one aspect of a computing device which can be used in one or more systems and methods for network timing monitoring and analytics.

FIG. 30 illustrates one embodiment of a computing device 1200 which can be used in one embodiment of the systems and methods for network monitoring and analytics. For the sake of clarity, the computing device 1200 is shown and described here in the context of a single computing device. It is to be appreciated and understood, however, that any number of suitably configured computing devices can be used to implement any of the described embodiments. For example, in at least some implementation, multiple communicatively linked computing devices are used. One or more of these devices can be communicatively linked in any suitable way such as via one or more networks (LANs), one or more wide area networks (WANs) or any combination thereof.

In this example, the computing device 1200 comprises one or more processor circuits or processing units 1202, on or more memory circuits and/or storage circuit component(s) 1204 and one or more input/output (I/O) circuit devices 1206. Additionally, the computing device 1200 comprises a bus 1208 that allows the various circuit components and devices to communicate with one another. The bus 1208 represents one or more of any of several types of bus structures, including a memory bus or local bus using any of a variety of bus architectures. The bus 1208 may comprise wired and/or wireless buses.

The processing unit 1202 may be responsible for executing various software programs such as system programs, applications programs, and/or module to provide computing and processing operations for the computing device 1200. The processing unit 1202 may be responsible for performing various voice and data communications operations for the computing device 1200 such as transmitting and receiving voice and data information over one or more wired or wireless communication channels. Although the processing unit 1202 of the computing device 1200 includes single processor architecture as shown, it may be appreciated that the computing device 1200 may use any suitable processor architecture and/or any suitable number of processors in accordance with the described embodiments. In one embodiment, the processing unit 1200 may be implemented using a single integrated processor.

The processing unit 1202 may be implemented as a host central processing unit (CPU) using any suitable processor circuit or logic device (circuit), such as a as a general purpose processor. The processing unit 1202 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 1202 may be coupled to the memory and/or storage component(s) 1204 through the bus 1208. The memory bus 1208 may comprise any suitable interface and/or bus architecture for allowing the processing unit 1202 to access the memory and/or storage component(s) 1204. Although the memory and/or storage component(s) 1204 may be shown as being separate from the processing unit 1202 for purposes of illustration, it is worthy to note that in various embodiments some portion or the entire memory and/or storage component(s) 1204 may be included on the same integrated circuit as the processing unit 1202. Alternatively, some portion or the entire memory and/or storage component(s) 1204 may be disposed on an integrated circuit or other medium (e.g., hard disk drive) external to the integrated circuit of the processing unit 1202. In various embodiments, the computing device 1200 may comprise an expansion slot to support a multimedia and/or memory card, for example.

The memory and/or storage component(s) 1204 represent one or more computer-readable media. The memory and/or storage component(s) 1204 may be implemented using any computer-readable media capable of storing data such as volatile or non-volatile memory, removable or non-removable memory, erasable or non-erasable memory, writeable or re-writeable memory, and so forth. The memory and/or storage component(s) 1204 may comprise volatile media (e.g., random access memory (RAM)) and/or nonvolatile media (e.g., read only memory (ROM), Flash memory, optical disks, magnetic disks and the like). The memory and/or storage component(s) 1204 may comprise fixed media (e.g., RAM, ROM, a fixed hard drive, etc.) as well as removable media (e.g., a Flash memory drive, a removable hard drive, an optical disk, etc.). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 1206 allow a user to enter commands and information to the computing device 1200, and also allow information to be presented to the user and/or other components or devices. Examples of input devices include a keyboard, a cursor control device (e.g., a mouse), a microphone, a scanner and the like. Examples of output devices include a display device (e.g., a monitor or projector, speakers, a printer, a network card, etc.). The computing device 1200 may comprise an alphanumeric keypad coupled to the processing unit 1202. The keypad may comprise, for example, a QWERTY key layout and an integrated number dial pad. The computing device 1200 may comprise a display coupled to the processing unit 1202. The display may comprise any suitable visual interface for displaying content to a user of the computing device 1200. In one embodiment, for example, the display may be implemented by a liquid crystal display (LCD) such as a touch-sensitive color (e.g., 76 bit color) thin-film transistor (TFT) LCD screen. The touch-sensitive LCD may be used with a stylus and/or a handwriting recognizer program.

The processing unit 1202 may be arranged to provide processing or computing resources to the computing device 1200. For example, the processing unit 1202 may be responsible for executing various software programs including system programs such as operating system (OS) and application programs. System programs generally may assist in the running of the computing device 1200 and may be directly responsible for controlling, integrating, and managing the individual hardware components of the computer system. The OS may be implemented, for example, as a Microsoft) Windows OS, Symbian OS™, Embedix OS, Unux OS, Binary Run-time Environment for Wireless (BREW) OS, JavaOS, Android OS, Apple OS or other suitable OS in accordance with the described embodiments. The computing device 1200 may comprise other system programs such as device drivers, programming tools, utility programs, software libraries, application programming interfaces (APIs), and so forth.

The computer 1200 also includes a network interface 1210 coupled to the bus 1208. The network interface 1210 provides a two-way data communication coupling to a local network 1212. For example, the network interface 1210 may be a digital subscriber line (DSL) modem, satellite dish, an integrated services digital network (ISDN) card or other data communication connection to a corresponding type of telephone line. As another example, the communication interface 1210 may be a local area network (LAN) card effecting a data communication connection to a compatible LAN. Wireless communication means such as internal or external wireless modems may also be implemented. In some aspects, a remote system 1214 may be in data communication with the computer system 1200 through the network 1212.

In any such implementation, the network interface 1210 sends and receives electrical, electromagnetic or optical signals that carry digital data streams representing various types of information, such as the selection of goods to be purchased, the information for payment of the purchase, or the address for delivery of the goods. The network interface 1210 typically provides data communication through one or more networks to other data devices. For example, the network interface 1210 may effect a connection through the local network to an Internet Host Provider (ISP) or to data equipment operated by an ISP. The ISP in turn provides data communication services through the internet (or other packet-based wide area network). The local network and the internet both use electrical, electromagnetic or optical signals that carry digital data streams. The signals through the various networks and the signals on the network Interface 1210, which carry the digital data to and from the computer system 1200, are exemplary forms of carrier waves transporting the information.

The computer 1200 can send messages and receive data, including program code, through the network(s) and the network interface 1210. In the Internet example, a server might transmit a requested code for an application program through the internet, the ISP, the local network (the network 1212) and the network interface 1210. In accordance with the invention, one such downloaded application provides for the identification and analysis of a prospect pool and analysis of marketing metrics. The received code may be executed by processor 1204 as it is received, and/or stored in storage device 1210, or other non-volatile storage for later execution. In this manner, computer 1200 may obtain application code in the form of a carrier wave.

Various embodiments may be described herein in the general context of computer executable instructions, such as software, program modules, and/or engines being executed by a computer. Generally, software, program modules, and/or engines include any software element arranged to perform particular operations or implement particular abstract data types. Software, program modules, and/or engines can Include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, program modules, and/or engines may be located in both local and remote computer storage media Including memory storage devices.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be Implemented, for example, by logic (e.g., instructions, data, and/or code) to be executed by a logic device (e.g., processor). Such logic may be stored internally or externally to a logic device on one or more types of computer-readable storage media In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general purpose processor or application specific processor. The embodiments, however, are not limited in this context.

While various details have been set forth in the foregoing description, it will be appreciated that the various embodiments of the apparatus, system, and method for anonymous sharing and public vetting of content may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are Intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to Illustrate principles and practical application to thereby enable one of ordinary skill in the art to utilize the various embodiments and with various modifications as are suited to the particular use contemplated. It is intended that the claims submitted herewith define the overall scope.

Some or all of the embodiments described herein may generally comprise technologies which can be implemented, individually, and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art In light of this disclosure. In addition, those skilled in the art will appreciate that the mechanisms of the subject matter described herein are capable of being distributed as a program product in a variety of forms, and that an Illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes Illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially In the appended claims (e.g., bodies of the appended claims) are generally intended as "open" terms (e.g., the term "including" should be interpreted as "including but not limited to," the term "having" should be interpreted as "having at least," the term "includes" should be interpreted as "Includes but is not limited to," etc.). It will be further understood by those within the art that if a specific number of an introduced claim recitation Is Intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and Indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the aft that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are Illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application-all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Various aspects of the subject matter described herein are set out in the following numbered examples:

Example 1

A network of computing devices, comprising:
a timing reference node;
a free-run node; and
a timing aggregator,
wherein the timing reference node comprises:
a first processor; and
a first non-transitory computer-readable medium coupled to the first processor, the first non-transitory computer-readable medium configured to store first computer program instructions that when executed by the first processor are operable to cause the first processor to:
calculate a first communication packet comprising a timing reference node timestamp and timing reference node data; and
transmit the first communication packet to the free-run node; wherein the free-run node comprises:
a second processor and
a second non-transitory computer-readable medium coupled to the second processor, the second non-transitory computer-readable medium configured to store second computer program instructions that when executed by the second processor are operable to cause the second processor to:
receive the first communication packet from the timing reference node;
calculate a second communication packet comprising a first metadata packet comprising a combination of the timing reference node timestamp, a sparse hash value calculated from the timing reference node data, and a free-run node timestamp; and
publish the second communication packet to the timing aggregator; and wherein the timing aggregator comprises:
a third processor, and
a third non-transitory computer-readable medium coupled to the third processor, the third non-transitory computer-readable medium configured to store third computer program instructions that when executed by the third processor are operable to cause the third processor to:
receive the second communication packet from the free-run node; and
calculate a timestamp compensation value based on the timing reference node timestamp, the sparse hash value, and the free-run node timestamp.

Example 2

A computer-implemented method comprising:
receiving, by a processor, from a reference node, a first communication packet comprising a reference node timestamp and reference node data;
calculating, by the processor, a second communication packet comprising the reference node timestamp, a sparse hash value of the reference node data, and a free-run timestamp;
publishing, by the processor, the second communication packet to a timing aggregator; and
receiving, by the processor from the timing aggregator, a third communication packet comprising timing compensation data.

Example 3

The method of Example 2, further comprising updating, by the processor, a local clock based on the timing compensation data.

Example 4

A computer-implemented method comprising:
receiving, by a processor, a plurality of communication packets from a plurality of observation points within a computer network, wherein each of the plurality of communication packets comprises a reference node timestamp, a sparse hash value of reference node data, and a free-run node timestamp; and
calculating, by the processor, an average transit time for all of the plurality of communication packets having a first reference node source, a first free-run node destination, and a first sparse hash value.

Example 5

A computer-implemented method comprising:
receiving, by a processor, a plurality of communication packets from a plurality of observation points within a computer network, wherein each of the plurality of communication packets comprises a reference node timestamp, a sparse hash value of reference node data, and a free-run node timestamp; and
calculating, by the processor, a time compensation value for a first free-run node destination from all of the plurality of communication packets having the first free-run node destination and the first sparse hash value.

Example 6

A computer-implemented method comprising:
receiving, by a processor, a plurality of communication packets from a plurality of observation points within a computer network, wherein each of the plurality of communication packets comprises a reference node timestamp, a sparse hash value of reference node data, and a free-run node timestamp; and
calculating, by the processor, a first packet transmission path through the computer network for all of the plurality of communication packets having a first reference node source, a first free-run node destination, and a first sparse hash value.

Example 7

The method of Example 6, further comprising calculating, by the processor, a second packet transmission path through the computer network for all of the plurality of communication packets having a first free-run node source, a first reference node destination, and a second sparse hash value.

Example 8

The method of and one of Example 6 through Example 7, wherein calculating, by the processor, a second packet transmission path through the computer network comprises calculating, by the processor, a second packet transmission path through the computer network that differs from the first packet transmission path.

Example 9

The method of Example 6, further comprising:
receiving, by a processor, a second plurality of communication packets from the plurality of observation points within the computer network, wherein each of the second plurality of communication packets comprises a reference node timestamp, a sparse hash value of reference node data, and a free-run node timestamp; and
calculating, by the processor, a third packet transmission path through the computer network for all of the second plurality of communication packets having the first reference node source, the first free-run node destination, and the first sparse hash value.

Example 10

The method of Example 9, wherein calculating, by the processor, a third packet transmission path through the computer network comprises calculating, by the processor, a third packet transmission path through the computer network that differs from the first packet transmission path.

Example 11

The method of Example 10, further comprising determining, by the processor, from the first packet transmission path and the third packet transmission path that at least one component of the computer network is non-functional.

Example 12

A network of computing devices, comprising:
a timing aggregator; and
a plurality of subgroups of computing devices, wherein each subgroup of the plurality of subgroups of computing devices comprises:
a timing reference node; and
a free-run node,
wherein the timing reference node comprises:
a first processor; and
a first non-transitory computer-readable medium coupled to the first processor, the first non-transitory computer-readable medium configured to store first computer program instructions that when executed by the first processor are operable to cause the first processor to:
calculate a first communication packet comprising a timing reference node timestamp and timing reference node data; and
transmit the first communication packet to the free-run node; and wherein the free-run node comprises:
a second processor; and
a second non-transitory computer-readable medium coupled to the second processor, the second non-transitory computer-readable medium configured to store second computer program instructions that when executed by the second processor are operable to cause the second processor to:
receive the first communication packet from the timing reference node;
calculate a second communication packet comprising a first metadata packet comprising a combination of the timing reference node timestamp, a sparse hash value calculated from the timing reference node data, and a free-run node timestamp; and
publish the second communication packet to the timing aggregator wherein the timing aggregator comprises:
a third processor; and
a third non-transitory computer-readable medium coupled to the third processor, the third non-transitory computer-readable medium configured to store third computer program instructions that when executed by the third processor are operable to cause the third processor to:
receive the second communication packet from each of the free-run nodes of each of the plurality of subgroups; and
calculate a timestamp compensation value based on the timing reference node timestamp, the sparse hash value, and the free-run node timestamp.

Example 13

The network of computing devices of Example 12, wherein the non-transitory computer-readable medium of each of the free-run nodes of each of the plurality of subgroups is configured to store computer program instructions that when executed by the processor of each of the free-run nodes of each of the plurality of subgroups to cause the processor of each of the free-run nodes of each of the plurality of subgroups to update a local dock based on the timestamp compensation data.

The invention claimed is:
1. A computer-implemented method for timestamp computation, the computer-implemented method comprising:
receiving, by a processor, from a reference node, a first communication packet comprising a reference node timestamp, and reference node data, wherein the reference node has a fungible clock;
calculating, by the processor, a second communication packet comprising the reference node timestamp, a sparse hash value of the reference node data, and a free-run timestamp, wherein a symmetric link assumption leads to non-causal timestamps for non-reference node paths;
calculating, by the processor, a phase offset in an asymmetric manner for each node;
calculating, by the processor, a frequency offset periodically, wherein the phase offset and the frequency offset are updated together;
publishing, by the processor, the second communication packet to a timing aggregator wherein the timing aggregator is configured to calculate the timestamp compensation by adding an uncompensated timestamp, the phase offset, and the frequency offset multiplied by the elapsed time since a last update of the phase offset and the frequency offset; and receiving, by the processor from the timing aggregator, a third communication packet comprising the timing compensation data, wherein the timing compensation data correct for non-causal timestamps.

2. The computer-implemented method of claim 1, further comprising:
updating, by the processor, a local clock, based on the timing compensation data.

3. A computer-implemented method for timestamp computation, the computer-implemented method comprising:
receiving, by a processor, a plurality of communication packets from a plurality of observation points within a computer network, wherein each of the plurality of communication packets comprises a reference node timestamp, a sparse hash value of reference node data, and a free-run node timestamp, wherein a symmetric link assumption leads to non-causal timestamps for non-reference node paths;
calculating, by the processor, a phase offset in an asymmetric manner for each node;
calculating, by the processor, a frequency offset periodically, wherein the phase offset and the frequency offset are updated together;
calculating, by the processor, an average transit time for all of the plurality of communication packets having a first reference node source, a first free-run node destination, and a first sparse hash value; and
calculating, by a timing aggregator, the timestamp compensation by adding an uncompensated timestamp, the phase offset, and the frequency offset multiplied by the elapsed time since a last update of the phase offset and the frequency offset, wherein the timing compensation data correct for non-causal timestamps.

4. A computer-implemented method for timestamp computation, the computer-implemented method comprising:
receiving, by a processor, a plurality of communication packets from a plurality of observation points within a computer network, wherein each of the plurality of communication packets comprises a reference node timestamp, a sparse hash value of reference node data, and a free-run node timestamp, wherein a symmetric link assumption leads to non-causal timestamps for non-reference node paths;
calculating, by the processor, a phase offset in an asymmetric manner for each node;
calculating, by the processor, a frequency offset periodically, wherein the phase offset and the frequency offset are updated together; and
calculating, by a timing aggregator, the timestamp compensation by adding an uncompensated timestamp, the phase offset, and the frequency offset multiplied by the elapsed time since a last update of the phase offset and the frequency offset, wherein the timing compensation data correct for non-causal timestamps.

5. A computer-implemented method for timestamp computation, the computer-implemented method comprising:
receiving, by a processor, a plurality of communication packets from a plurality of observation points within a computer network, wherein each of the plurality of communication packets comprises a reference node timestamp, a sparse hash value of reference node data, and a free-run node timestamp, wherein a symmetric link assumption leads to non-causal timestamps for non-reference node paths;
calculating, by the processor, a phase offset in an asymmetric manner for each node;
calculating, by the processor, a frequency offset periodically, wherein the phase offset and the frequency offset are updated together;
calculating, by the processor, a first packet transmission path through the computer network for all of the plurality of communication packets having a first reference node source, a first free-run node destination, and a first sparse hash value; and
calculating, by a timing aggregator, the timestamp compensation by adding an uncompensated timestamp, the phase offset, and the frequency offset multiplied by the elapsed time since a last update of the phase offset and the frequency offset, wherein the timing compensation data correct for non-causal timestamps.

6. The computer-implemented method of claim 5, further comprising:
calculating, by the processor, a second packet transmission path through the computer network for all of the plurality of communication packets having a first free-run node source, a first reference node destination, and a second sparse hash value.

7. The computer-implemented method of claim 6, further comprising:
calculating, by the processor, a second packet transmission path through the computer network that differs from the first packet transmission path.

8. The computer-implemented method of claim 5, further comprising:
receiving, by a processor, a second plurality of communication packets from the plurality of observation points within the computer network, wherein each of the second plurality of communication packets comprises the reference node timestamp, the sparse hash value of reference node data, and the free-run node timestamp; and
calculating, by the processor, a third packet transmission path through the computer network for all of the second plurality of communication packets having the first reference node source, the first free-run node destination, and the first sparse hash value.

9. The computer-implemented method of claim 8, further comprising:
calculating, by the processor, a third packet transmission path through the computer network that differs from the first packet transmission path.

10. The computer-implemented method of claim 9, further comprising:
determining, by the processor, from the first packet transmission path and the third packet transmission path that at least one component of the computer network is non-functional.

* * * * *